(12) United States Patent
Takahashi et al.

(10) Patent No.: US 7,896,947 B2
(45) Date of Patent: Mar. 1, 2011

(54) AIR FILTERING APPARATUS

(75) Inventors: Kazuo Takahashi, Gunma (JP); Yoichi Uchida, Tochigi (JP); Hiroaki Usui, Gunma (JP); Toshio Fukushima, Gunma (JP); Toru Arakawa, Gunma (JP); Hiroyuki Kobayashi, Gunma (JP); Tsuyoshi Rakuma, Gunma (JP); Tetsuya Yamamoto, Gunma (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 636 days.

(21) Appl. No.: 11/832,124

(22) Filed: Aug. 1, 2007

(65) Prior Publication Data

US 2008/0028936 A1    Feb. 7, 2008

(30) Foreign Application Priority Data

Aug. 7, 2006   (JP)  ............................. 2006-214387
Aug. 21, 2006  (JP)  ............................. 2006-223922

(51) Int. Cl.
*B01D 47/00* (2006.01)
(52) U.S. Cl. ............................. 95/26; 95/149; 96/234; 96/243; 96/259; 422/186.07; 422/186.08
(58) Field of Classification Search .................... 96/243, 96/22, 259, 234; 95/26, 149; 422/186.07, 422/186.08
See application file for complete search history.

(56) References Cited

U.S. PATENT DOCUMENTS

| 5,354,515 | A | 10/1994 | Ushimaru | |
| 6,180,014 | B1 * | 1/2001 | Salama | .................. 210/748 |
| 2001/0004962 | A1 * | 6/2001 | Hirota et al. | ............. 204/228.1 |
| 2003/0056648 | A1 * | 3/2003 | Fornai et al. | ................... 95/65 |
| 2004/0013563 | A1 | 1/2004 | Romer et al. | |
| 2005/0072308 | A1 * | 4/2005 | Aoyagi | ........................ 96/235 |

FOREIGN PATENT DOCUMENTS

JP        62069033 A      3/1987

(Continued)

OTHER PUBLICATIONS

Office Action mailed Aug. 4, 2009 in corresponding Canadian Application No. 2,593,954.

*Primary Examiner*—Duane Smith
*Assistant Examiner*—Tiffany N Palmer
(74) *Attorney, Agent, or Firm*—Westerman, Hattori, Daniels & Adrian, LLP

(57) ABSTRACT

An air filtering apparatus including an electrolytic bath for electrolyzing water to generate electrolytic water, a gas-liquid contact member in which the electrolytic water generated in the electrolytic bath infiltrates and an air blowing fan for blowing air to the gas-liquid contact member is equipped with a water circulation passage through which the electrolytic water is supplied/circulated to the gas-liquid contact member, the electrolytic water passing through the gas-liquid contact member is received and stocked by a water receiving tray and the stocked electrolytic water is pumped up and supplied to the gas-liquid contact member, a drain pipe branched from the water circulation passage, a water stop valve for opening/closing the drain pipe, and a drain receiver for receiving and stocking the electrolytic water discharged from the drain pipe when the water stop valve is opened.

6 Claims, 15 Drawing Sheets

FOREIGN PATENT DOCUMENTS

| | | |
|---|---|---|
| JP | 2000257913 A | 9/2000 |
| JP | 2000334240 A | 12/2000 |
| JP | 2002-181358 A | 6/2002 |
| JP | 2003001043 A | 1/2003 |
| WO | 0190001 A1 | 11/2001 |

* cited by examiner

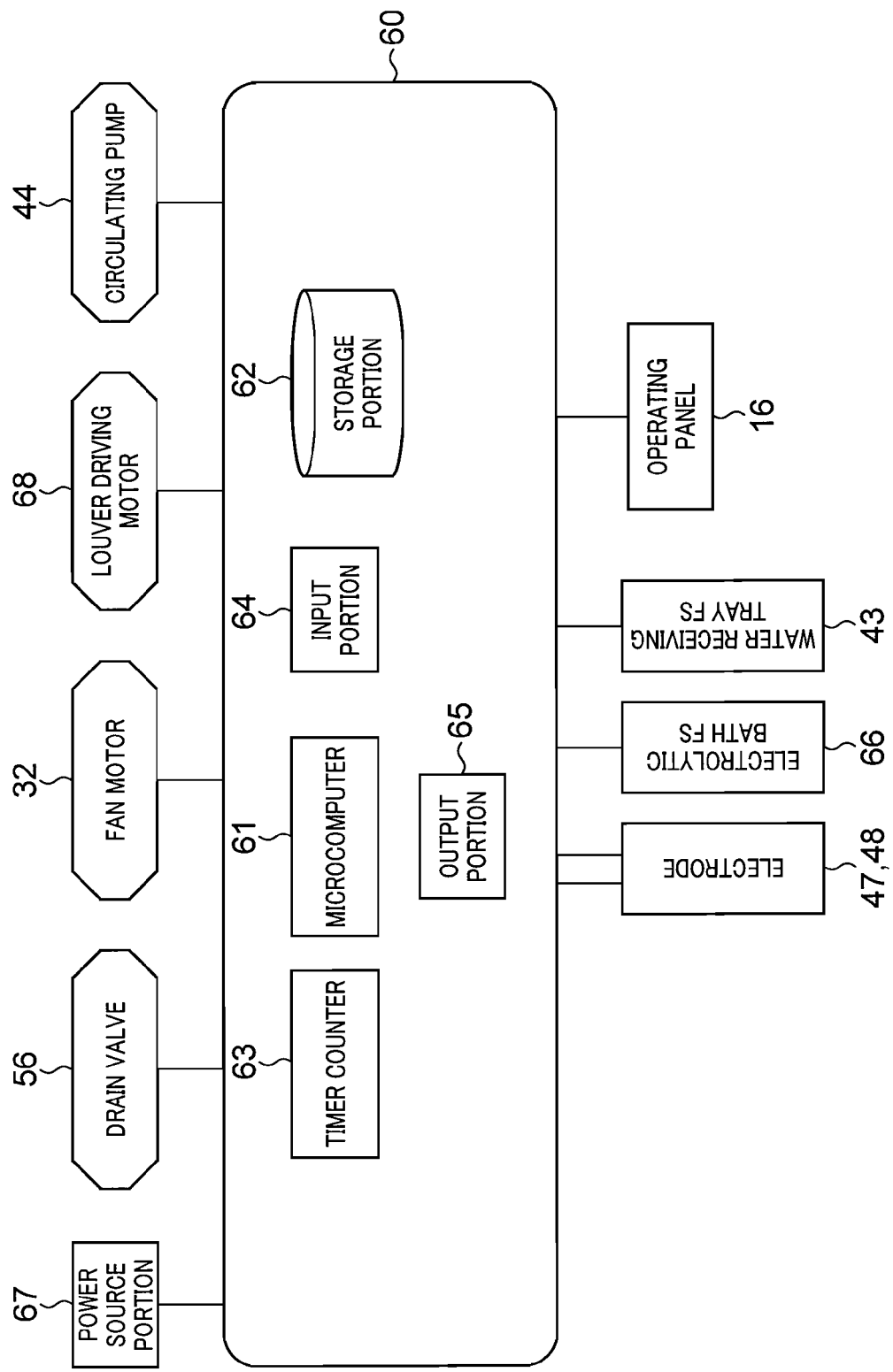

AIR FILTERING APPARATUS

INCORPORATION BY REFERENCE

The present application claims priority under 35 U.S.C. §119 to Japanese Patent Application No. 2006-214387 filed on Aug. 7, 2006 and Japanese Patent Application No. 2006-223922 filed on Aug. 21, 2006. The content of the application is incorporated herein by reference in its entirety.

BACKGROUND OF THE INVENTION

1. Field of the Invention

The present invention relates to an air filtering apparatus that can remove (sterilize, inactivate or the like) microorganisms such as bacteria, virus, fungus, etc. (hereinafter referred to as "virus, etc.") floating in the air.

2. Description of the Related Art

For the purpose of removing virus, etc. floating in the air, there has been proposed an air filtering apparatus for electrolyzing tap water or the like to generate electrolytic water containing active oxygen species such as hypochlorous acid or the like, supplying the electrolytic water concerned to a humidifying element (filter, gas-liquid contact member) formed of non-woven cloth or the like while supplying air to the humidifying element so that the virus, etc. contained in the air is brought into contact with the electrolytic water supplied to the humidifying element, thereby inactivating the virus, etc. and thus filtering the air (for example, JP-A-2002-181358).

The air filtering apparatus as described above has been frequently used for a long term, and thus it has been strongly required that the maintenance of the apparatus is facilitated and the labor required for the maintenance is lowered.

SUMMARY OF THE INVENTION

Therefore, the present invention has been implemented in view of the foregoing situation, and has an object to provide an air filtering apparatus for which maintenance can be easily performed.

In order to attain the above object, according to a first aspect of the present invention, an air filtering apparatus including an electrolytic bath for electrolyzing water to generate electrolytic water, a gas-liquid contact member in which the electrolytic water generated in the electrolytic bath infiltrates and an air blowing fan for blowing air to the gas-liquid contact member comprises: a water circulation passage through which the electrolytic water is supplied/circulated to the gas-liquid contact member, the electrolytic water passing through the gas-liquid contact member is received and stocked by a water receiving tray and the stocked electrolytic water is pumped up and supplied to the gas-liquid contact member; a drain pipe branched from the water circulation passage; a water stop valve for opening/closing the drain pipe; and a drain receiver for receiving and stocking the electrolytic water discharged from the drain pipe when the water stop valve is opened.

According to the above air filtering apparatus, the electrolytic water circulated in the water circulation passage is drained to the drain receiver by opening the water stop valve. Therefore, water exchange can be simply performed, the maintenance of the air filtering apparatus can be facilitated, and also the inside of the air filtering apparatus can be kept clean with little labor.

Here, the electrolytic water discharged to the drain receiver may be used as cleaning water or the like to actively use the air filtering performance thereof (for example, inactivation, sterilization or the like of virus, etc.). In this case, virus, etc. and allergy materials which adhere to the floor surface or the like can be suppressed, and thus the electrolytic water having the air filtering performance can be effectively used for the other purposes than the air filtering purpose.

In the above air filtering apparatus, a part of the water receiving tray may be provided with a stock portion having a bottom deeper than that of the water receiving tray, and the drain pipe may be a pipe extending from the stock portion of the water receiving tray to the drain receiver located at the lower side of the water receiving tray.

In this case, when the water stop valve is opened, the electrolytic water stocked in the stock portion of the water receiving tray naturally is made to flow down by gravitational force to be discharged to the drain receiver. Therefore, the electrolytic water can be surely discharged by the simple construction.

Furthermore, the above air filtering apparatus may be equipped with a time counter for counting an operation time, and a controller for opening the water stop valve when the operation time counted by the time counter reaches a predetermined time.

In this case, the electrolytic water of the water circulation passage is discharged and exchanged by new electrolytic water every time the operation time reaches a predetermined time, and thus the exchange of water can be periodically performed. Furthermore, the water exchange timing can be automatically controlled, and thus the maintenance of the air filtering apparatus is facilitated.

Furthermore, the electrolytic bath may be designed to generate electrolytic water by applying a voltage between at least a pair of electrodes, under normal operation the controller may apply the voltage between the plural electrodes of the electrolytic bath to generate the electrolytic water, circulate the electrolytic water along the water circulation passage and control the air blowing fan to blow air, and also when the water stop valve is opened for drainage, the controller may generate electrolytic water while the polarities of the electrodes are inverted, circulate the thus-generated electrolytic water in the water circulation passage, and then open the water stop valve.

In this case, under the state that the polarities of the electrodes of the electrolytic bath are inverted from the polarities under the normal operation state, the water stop valve is opened and the electrolytic water is discharged from the water circulation passage. Here, in the electrolytic bath, the polarities of the electrodes are inverted, and thus scales such as calcium carbonate, magnesium carbonate, etc. which adhere to the electrodes under normal operation or the like are exfoliated from the electrodes. The exfoliated scales are suspended in the electrolytic water and discharged to the drain receiver together with the electrolytic water. As described above, the controller inverts the polarities of the electrodes of the electrolytic bath and then opens the water stop valve, whereby the scales accumulated in the electrolytic bath are discharged to the drain receiver together with the electrolytic water. Therefore, the water exchange and the removable of the scales can be performed at the same time. Accordingly, the load of the maintenance can be greatly reduced, and the air filtering apparatus can be kept to an excellent state for a long term by a simple maintenance. Furthermore, the controller controls the air blowing fan not to operate during the water exchange operation, so that unnecessary power consumption can be suppressed.

The controller may have a function of electrolyzing water such as tap water or the like under the state that the polarities of the plural electrodes of the electrolytic bath are inverted.

Here, when the controller inverts the polarities of the electrodes of the electrolytic bath to electrolyze water, active oxygen species such as hypochlorous acid, ozone or the like which has strong oxidation action are generated in the electrolytic bath. Therefore, electrolytic water containing active oxygen species such as hypochlorous acid, ozone or the like which has strong oxidation action is circulated in the water circulation passage, and then this electrolytic water is discharged from the drain pipe. Accordingly, at the water exchange time, the water circulation passage and the gas-liquid contact member can be cleaned and sterilized. Particularly, active oxygen species which are different from active oxygen species generated under normal operation are generated in the electrolytic bath because the polarities of the electrodes are inverted. Therefore, the water circulation passage and the gas-liquid contact member can be more effectively cleaned and sterilized by using the active oxygen species (active oxygen materials) different from the active oxygen species generated under normal operation.

Furthermore, the air filtering apparatus may be further equipped with an exhaust port through which air passing through the gas-liquid contact member is discharged, and a lid member which can close the exhaust port, and the controller may invert the polarities of the electrodes of the electrolytic bath under the state that the exhaust port is closed by the lid member.

In this case, the exhaust port is closed during the period when the controller applies a voltage to the electrodes of the electrolytic bath to generate electrolytic water containing active oxygen species (active oxygen materials) such as ozone, hypochlorous acid or the like and circulates the electrolytic water in the water circulation passage. Therefore, odor caused by the active oxygen species is prevented from leaking from the exhaust port. Accordingly, the water circulation passage and the gas-liquid contact member can be cleaned and sterilized and exchanged by new water while the atmosphere of a room in which the air filtering apparatus is set up can be kept comfortable. Furthermore, the controller controls the air blowing fan not to operate during a series of operations for exchanging water as described above, and thus the leakage of odor can be surely suppressed.

Furthermore, according to a second aspect of the present invention, an air filtering apparatus including an electrolytic bath for electrolyzing water such as tap water or the like to generate electrolytic water, a gas-liquid contact member in which the electrolytic water generated in the electrolytic bath infiltrates and an air blowing fan for blowing air to the gas-liquid contact member further comprises a water circulation passage for supplying/circulating the electrolytic water to the gas-liquid contact member, and a controller for controlling the air filtering apparatus to selectively execute one of an air filtering operation in which the electrolytic water is generated in the electrolytic bath and circulated in the water circulation passage and the air is blown to the gas-liquid contact member by the air blowing fan to thereby filter the air, and a cleaning operation in which the electrolytic water is generated in the electrolytic bath and circulated in the water circulation passage under the state that the air blowing fan is stopped.

According to the above air filtering apparatus, the controller executes the cleaning operation for circulating the electrolytic water in the water circulation passage separately from the air filtering operation for removing virus, etc. floating in the air.

In this type of air filtering apparatus, when the non-operation state is continued, the gas-liquid contact member is dried and thus the air filtering performance (the performance of removal, inactivation, sterilization or the like of the virus, etc.) is lost because no electrolytic water is supplied to the gas-liquid contact member, so that various bacteria, fungus, etc. and virus, etc. may breed. Therefore, it has been hitherto recommended to clean and wash the gas-liquid contact member manually. On the other hand, according to the air filtering apparatus of this invention, the cleaning operation is automatically performed and thus the gas-liquid contact member is prevented from being dried. Therefore, the inside of the air filtering apparatus can be kept clean even when the frequency of the manual cleaning/washing work is reduced and thus the labor of the maintenance is reduced, so that the maintenance can be facilitated.

In the above air filtering apparatus, the controller may execute the cleaning operation every time a predetermined time elapses from the time when the air filtering apparatus stops the air filtering operation.

In this case, even when the state that the air filtering operation is not executed is continued, the controller executes the cleaning operation every time a predetermined time elapses, and thus electrolytic water is periodically supplied to each part of the water circulation passage containing the gas-liquid contact member. Accordingly, even when the air filtering operation is stopped for a long time, the cleanliness of the inside of the air filtering apparatus can be kept. Furthermore, since the controller executes the cleaning operation at the optimum frequency and at the optimum timing, it is unnecessary to manage the frequency, timing, etc. of the cleaning operation, and also unnecessary cleaning can be saved, so that the energy can be saved.

Furthermore, in the above air filtering apparatus, the controller may execute the cleaning operation under the state that the air blowing fan is stopped.

In this case, during cleaning operation, the air filtering apparatus hardly emits sounds except for the circulation sound of the electrolytic water, and the quietness of the room where the air filtering apparatus is set up can be kept. Accordingly, a manager for managing the air filtering apparatus can execute the cleaning operation with no restriction to the time zone and the setup atmosphere.

Furthermore, the flow of air between the exterior and interior of the apparatus is suppressed during cleaning operation, and thus odor, etc. which are caused by the electrolytic water in the air filtering apparatus can be prevented from leaking to the outside of the apparatus.

Still furthermore, in the above air filtering apparatus, during cleaning operation, the controller may control the electrolytic bath to generate active oxygen species different from active oxygen species generated during execution of the air filtering operation.

In this case, the controller controls the electrolytic bath to generate electrolytic water containing active oxygen species different from those under normal air filtering operation and circulate the electrolytic water concerned in the water circulation passage, so that the water circulation passage and the gas-liquid contact member can be effectively cleaned and sterilized.

Here, the active oxygen species generated in the electrolytic bath during execution of the cleaning operation may be ozone.

Furthermore, during cleaning operation, the controller may control the electrolytic bath to generate active oxygen species whose concentration is different from that under execution of the air filtering operation.

In this case, during cleaning operation, the controller controls the electrolytic bath to generate electrolytic water containing active oxygen species whose concentration is different from that under the air filtering operation, and thus for example, the water circulation passage and the gas-liquid contact member can be cleaned and sterilized by using the electrolytic water containing active oxygen species of a higher concentration than that under the air filtering operation, so that higher cleanliness can be kept in the room.

Furthermore, in the above air filtering apparatus, the exhaust port for discharging air blown by the air blowing fan to the outside of the apparatus may be equipped with a louver which can close the exhaust port, and the controller may execute the cleaning operation under the state that the exhaust port is closed by the louver.

In this case, the controller closes the louver during cleaning operation, so that the operation sound during cleaning operation can be prevented from leaking to the apparatus and thus quietness can be kept. Furthermore, the flow of air between the exterior and interior of the apparatus is suppressed during cleaning operation, and thus odor, etc. which are caused by electrolytic water in the apparatus can be prevented from leaking to the outside of the apparatus. Therefore, room where the air filtering apparatus is set up is hardly influenced, and thus the cleaning operation can be executed with no restriction to the time zone and the setup atmosphere.

Furthermore, the above air filtering apparatus may be equipped with a water supply unit for supplying water from a water supply pipe at the outside to the water circulation passage, and a drain unit that is branched from the water circulation passage and discharges the electrolytic water.

In this case, the water supply/discharge operation of the air filtering apparatus can be performed by using the water supply pipe and the drain pipe, and thus the manual water supply/discharge operation is not required. Therefore, the controller can control to automatically perform the water supply/drain operation at all times. Therefore, even when the air filtering operation is not executed for a long term, the cleaning operation can be executed with no restriction to the water supply and discharge. Therefore, the cleanliness of the inside of the apparatus can be surely kept without increasing the labor of maintenance.

As described above, according to the air filtering apparatus of the present invention, the maintenance can be extremely easily performed, and the inside of the apparatus can be kept clean with little labor.

BRIEF DESCRIPTION OF THE DRAWINGS

FIGS. 7A and 7B are diagrams showing an electrolytic water circulating portion equipped to the air filtering apparatus of FIG. 1, wherein FIG. 7A is a schematic diagram showing the construction of a water circulation passage, and FIG. 7B is a diagram showing the construction of an electrolytic bath;

FIG. 8 is a functional block diagram showing the construction of a control system of the air filtering apparatus according to a first embodiment;

DETAILED DESCRIPTION OF THE PREFERRED EMBODIMENTS

Preferred embodiments according to the present invention will be described hereunder with reference to the accompanying drawings.

Figure 1:
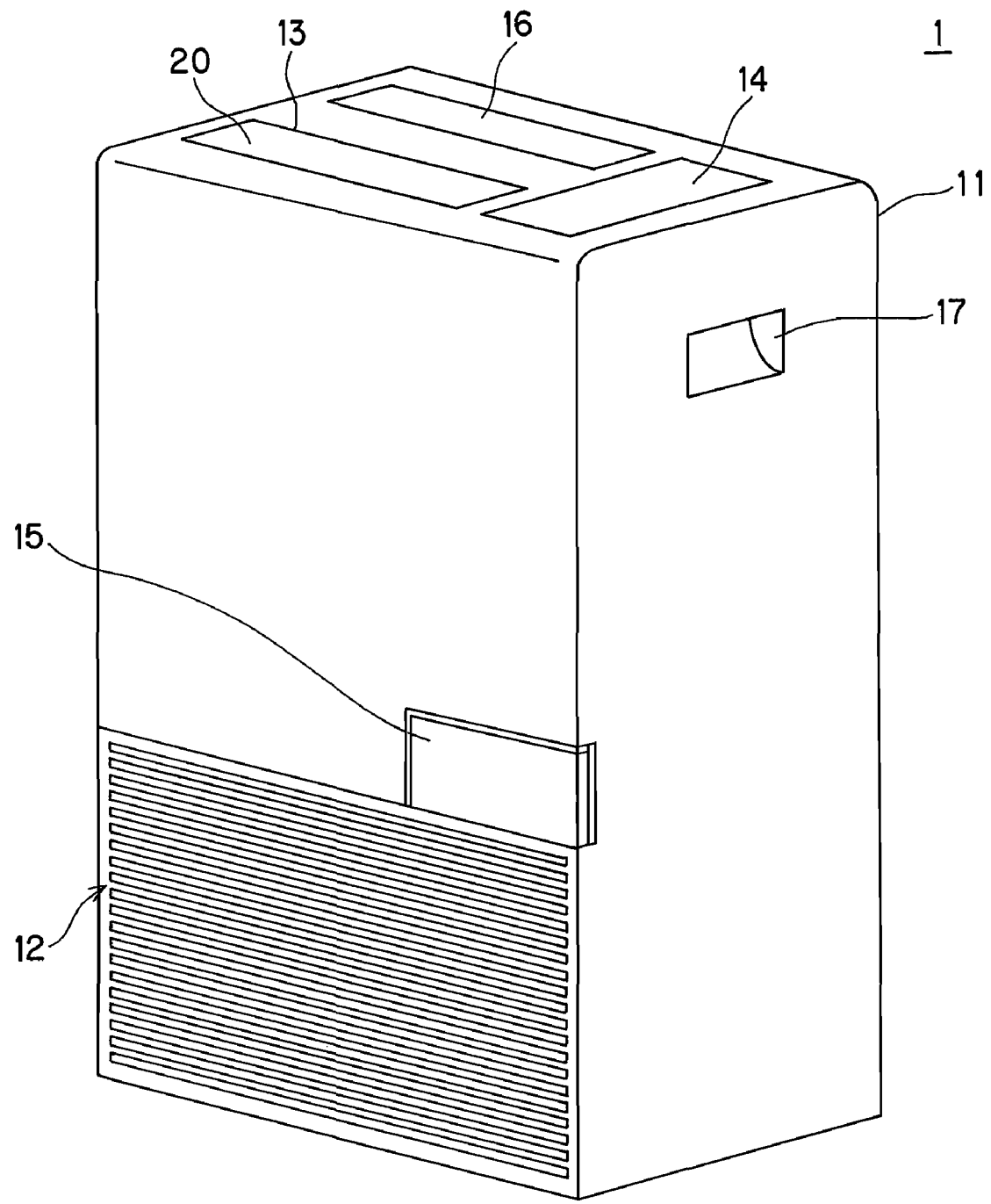
FIG. 1 is a perspective view showing the outlook of an air filtering apparatus according to a first embodiment.

FIG. 1 is a perspective view showing the outlook of an air filtering apparatus 1 according to a first embodiment of the present invention.

As shown in FIG. 1, the air filtering apparatus 1 has a vertically long box-shaped housing 11, and it is set up on the floor, for example. An air suction grille 12 is provided to the lower portion of the front face of the housing 11, and an air blow-out port 13 (exhaust port) is provided to the top face of the housing 11. The air filtering apparatus 1 sucks through the air suction grille 12 indoor air of a room where the air filtering apparatus is set up, filters the sucked air and then discharges the air from the air blow-out port 13, thereby cleaning the indoor air. Here, in this specification, "filter air" broadly means removal, inactivation, sterilization or the like of various bacteria, fungus, virus, etc. (hereinafter referred to as "virus, etc.").

A water supply tank take-out port 14 through which a water supply tank 41 (FIG. 2) described later is taken in/out is provided to the top face of the housing 11, and a drain receiver take-out port 15 through which a drain receiver 57 described later is taken in/out is provided to the front face of the housing 11. An opening/closing lid is secured to each of the water supply tank take-out port 14 and the drain receiver take-out port 15. Furthermore, the air blow-out port 13 is provided with a louver 20 for changing the air blow-out direction.

A grip portion 17 is formed at the upper portion of each of both the side faces of the housing 11. The grip portion 17 is a recess portion to which a hand is hooked when the housing 11 is carried by the hand. Accordingly, a user can lift up and carry the air filtering apparatus solely.

Figure 6:
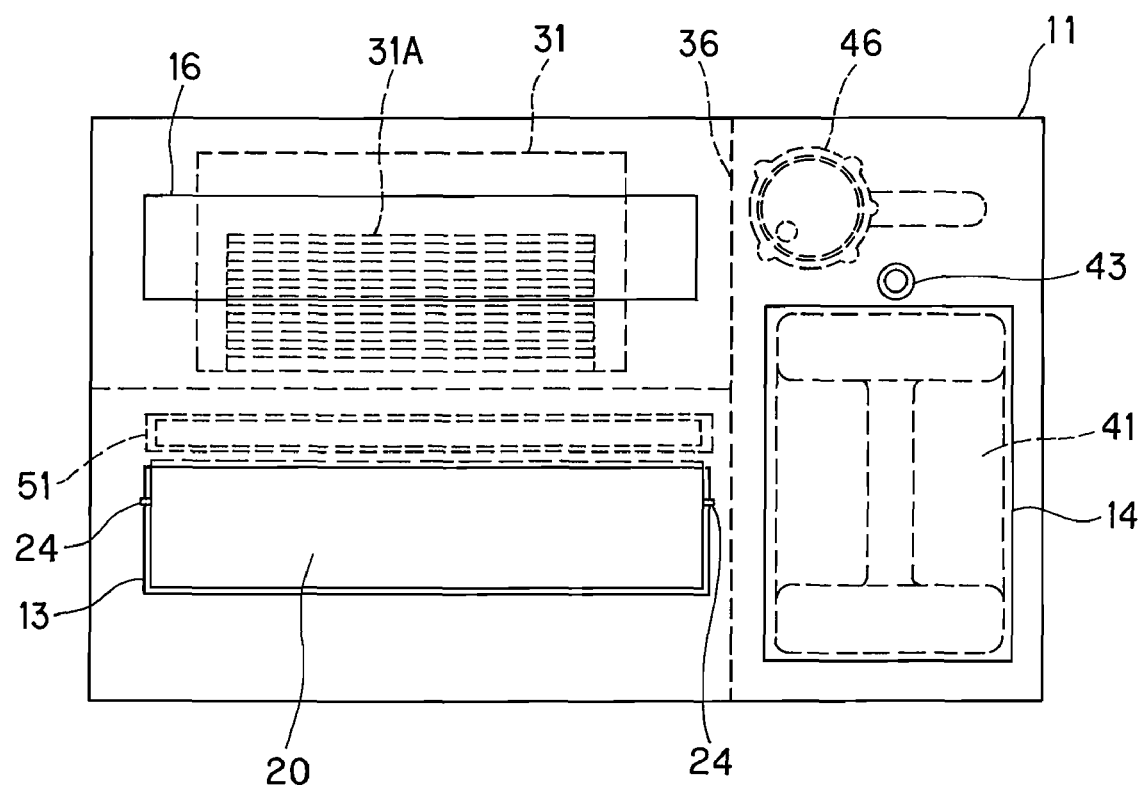
FIG. 6 is a top view showing the internal construction of the air filtering apparatus of FIG. 1.

Next, the internal construction of the air filtering apparatus 1 will be described with reference to FIGS. 2 and 6.

Figure 2:
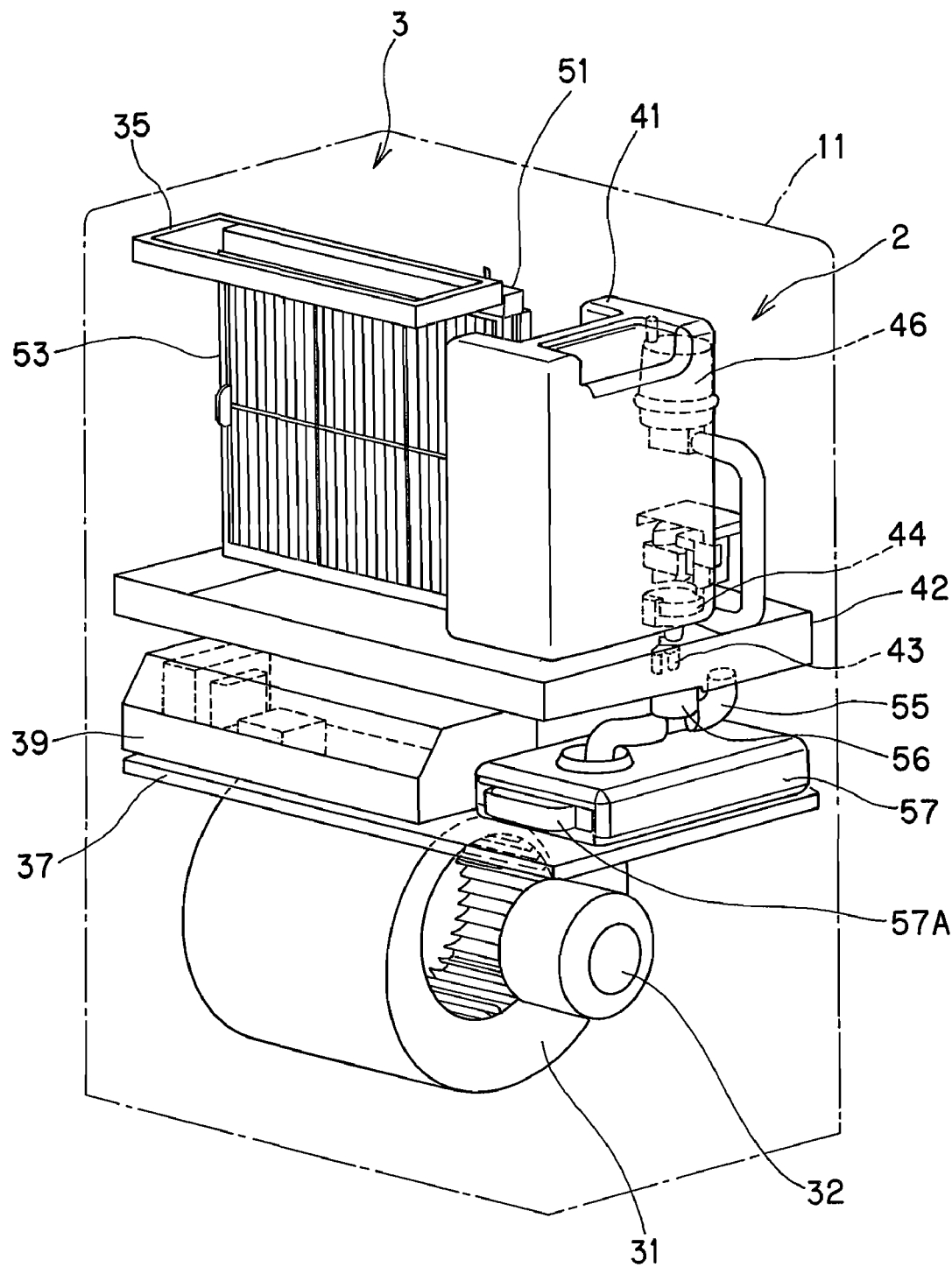
FIG. 2 is a perspective view showing the internal construction of the air filtering apparatus of FIG. 1.
Figure 3:
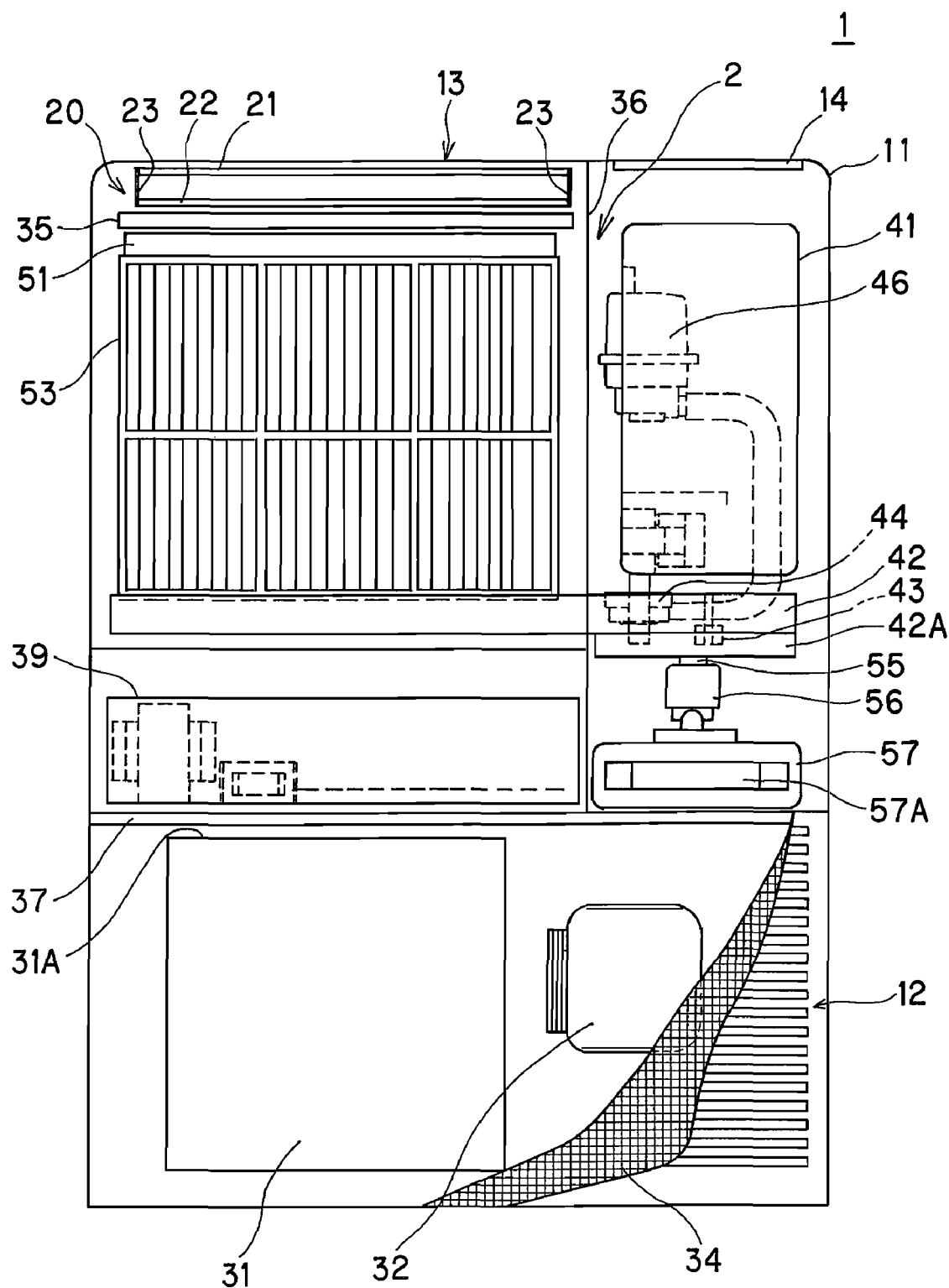
FIG. 3 is a partially exploded front view showing the internal construction of the air filtering apparatus of FIG. 1.
Figure 4:
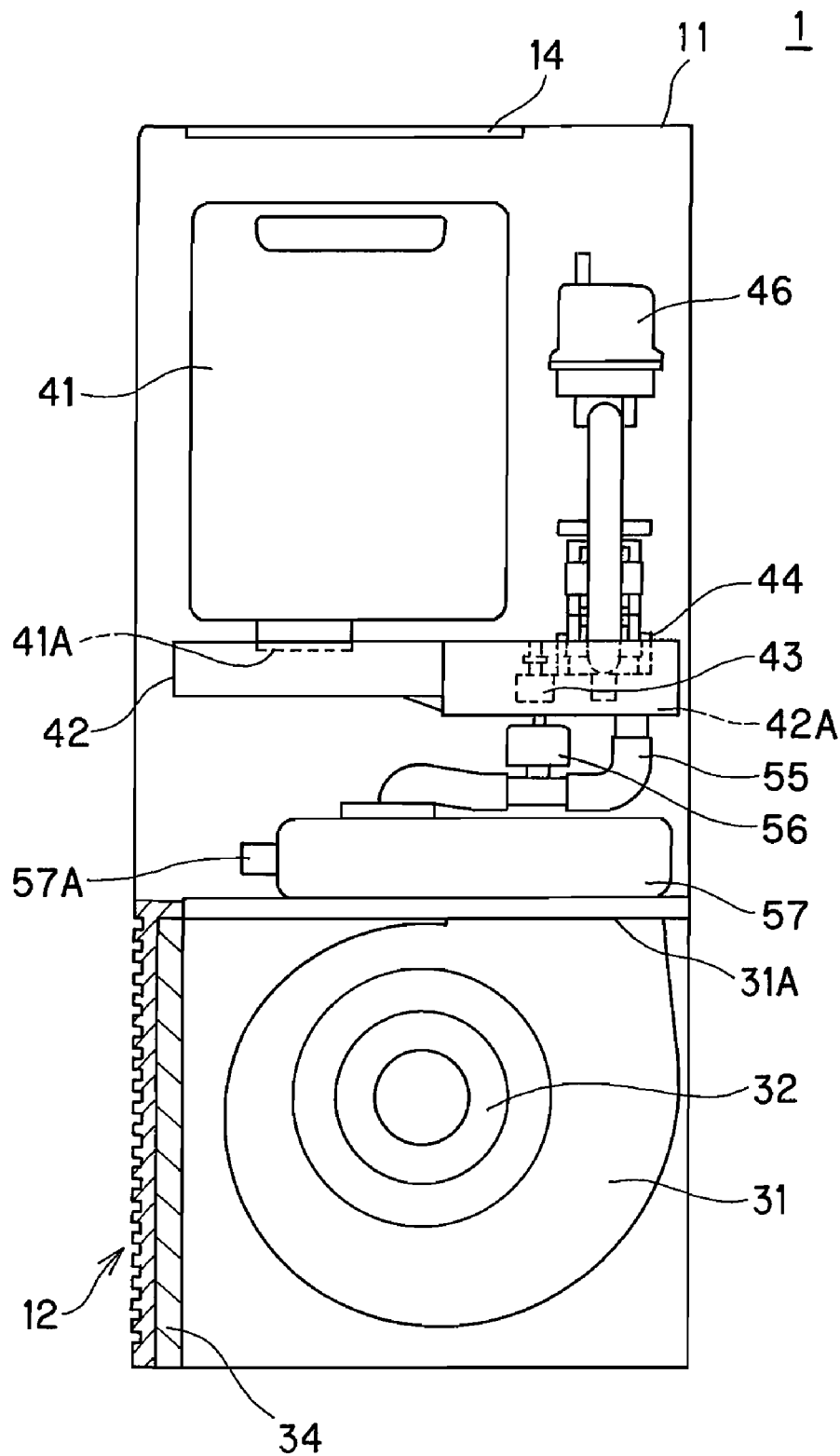
FIG. 4 is a left side cross-sectional view showing the internal construction of the air filtering apparatus of FIG. 1.

FIG. 2 is a perspective view showing the internal construction of the air filtering apparatus 1. In FIG. 2, the outlook of the housing 11 is shown by a virtual line for reference. FIG. 3 is a partially exploded front view showing the construction of the air filtering apparatus 1, FIG. 4 is a left side cross-sectional view, FIG. 5 is a right side cross-sectional view and FIG. 6 is a top view.

The inside of the housing 11 is divided to upper and lower chambers by a support plate 37, and an air blowing fan 31 and a fan motor 32 are accommodated in the lower chamber. The air blowing fan 31 is driven by the fan motor 32 to suck indoor air of the room through the air suction grille 12 and blow out the air from an air blow-out port 31A. The air blow-out port 31A of the air blowing fan 31 is disposed face up at the back side portion of the housing 11, and an opening is provided to the support plate 37 so as to be overlapped with the air blow-out port 31A. The opening of the support plate 37 intercommunicates with a space 1A extending vertically at the back side of the housing 11 (see FIG. 1) An air guide plate 38 which slants to the front face side of the housing 11 is disposed at the upper portion of the space 1A, and the front end of the air guide plate 38 is connected to the upper end of a water-spray box 51 described later.

Figure 5:
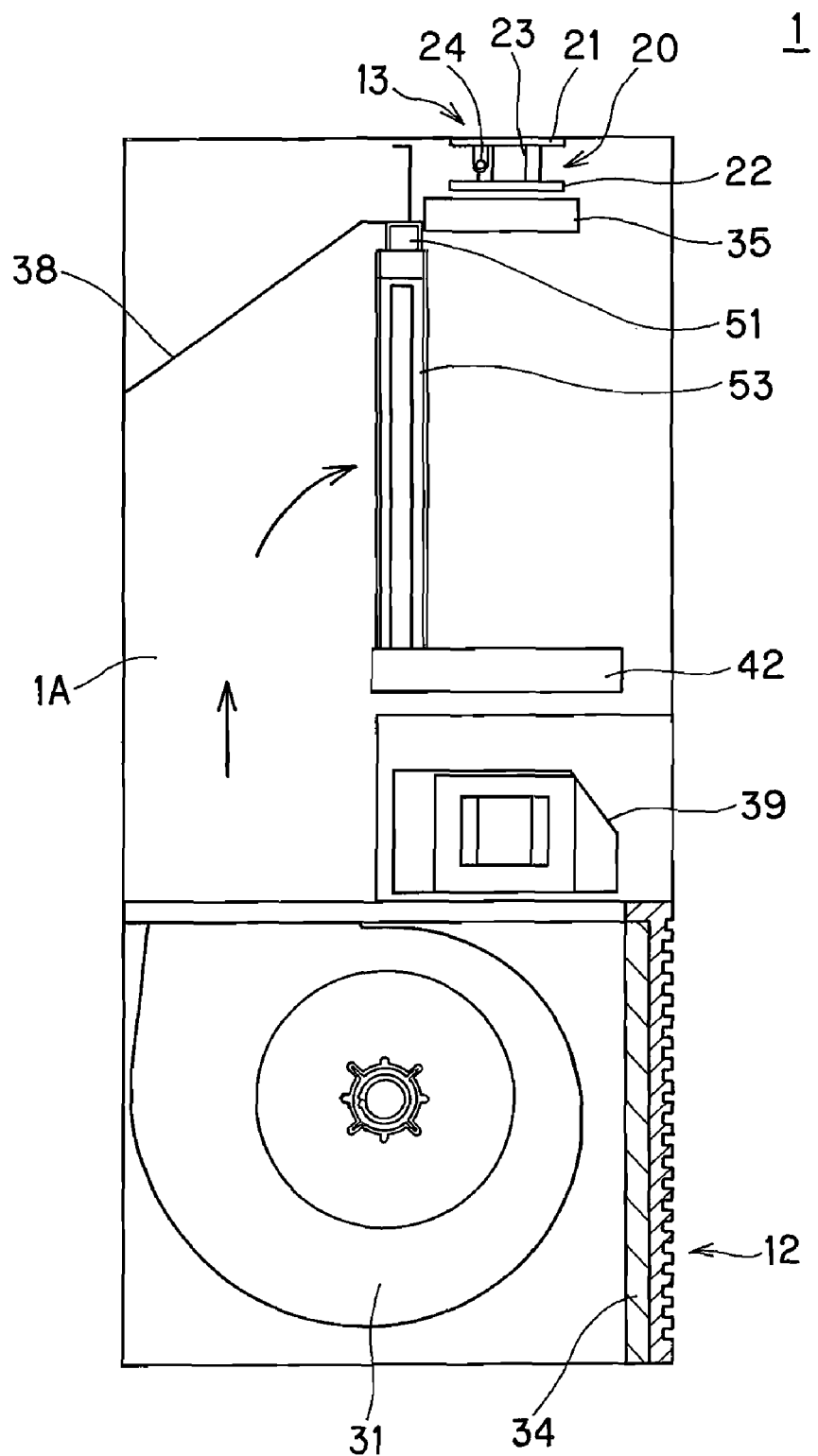
FIG. 5 is a right side cross-sectional view showing the internal construction of the air filtering apparatus of FIG. 1.

Therefore, air which is blown out from the air blow-out port 31A of the air blowing fan 31 is passed through the space 1A as indicated by an arrow of FIG. 5, and blown out to the back surface of the gas-liquid contact member 53.

Furthermore, a pre-filter 34 is disposed in the housing 11 so as to be superposed on the back side of the air suction grille 12. The pre-filter 34 is a filter for collecting materials whose sizes are not smaller than the particle diameter of 10 μm (micrometer). Air from which grass pollen, dust, etc. floating in the air is removed is sucked by the air blowing fan 31.

An electrical component box 39 and an electrolytic circulating unit 2 are disposed on the support plate 37. A control board (not shown) having various devices constituting a controller 60 described later mounted thereon, and various kinds of electrical components such as a power supply circuit for supplying a power source voltage to the fan motor 32, etc. are accommodated in the electrical component box 39.

The electrolytic water circulating unit 2 (water circulation passage) is equipped with a water receiving tray 42, a water receiving tray float switch 43, a circulating pump 44, an electrolytic bath 46, a water spray box 51 and a gas-liquid contact member 53.

The water receiving tray 42 is located above the electrical component box 39 to receive water dropped from the gas-liquid contact member 53, and it has such a depth that a predetermined amount of water can be stocked in the water receiving tray 42. One end portion of the water receiving tray 42 is designed to be deeper and serves as a water stock portion 42A. A water receiving tray float switch 43 for detecting the water level is disposed in the water stock portion 42a. The water receiving tray float switch 43 is switched on when the water level of the water stock portion 42A is less than a predetermined water level.

A water supply tank 41 is disposed above the water stock portion 42A so that water can be supplied from the water supply tank 41 to the water stock portion 42A. Specifically, a float valve (not shown) is provided to the water supply port 41A formed at the lower end of the water supply tank 41. When the water surface of the water stock portion 42A is lower than the water supply port 41A, a required amount of water is supplied from the water supply tank 41, so that the water level of the water stock portion 42A is kept constant.

Furthermore, the circulating pump 44 is disposed above the water stock portion 42A. The circulating pump 44 operates according to the control of the controller 60 (FIG. 8), and it pumps up water stocked in the water stock portion 42A and feeds the pumped water to the electrolytic bath 46. The electrolytic bath 46 contains plural electrodes (for example, at least a pair of electrodes) as described later, and a voltage supplied from the controller 60 (FIG. 8) is applied between these electrodes to electrolyze water (tap water or the like) and generate electrolytic water. The electrolytic water generated in the electrolytic bath 46 is pushed out from the electrolytic bath 46 by water discharged by the circulating pump 44, and supplied to the water spray box 51.

The water spray box 51 is a tubular member assembled to the upper portion of the gas-liquid contact member 53. Plural water spray holes are formed in the lower surface of the water spray box 51, and electrolytic water is dropped from the water spray holes 52 to the gas-liquid contact member 53. The gas-liquid contact member 53 is designed as a substantially plate-shaped member in which the electrolytic water dropped from the water spray box 51 is dropped, and it is disposed above the water receiving tray 42 together with the water spray box 51. A shown in FIG. 5, the gas-liquid contact member 53 is substantially vertically erected, and the lower end thereof intrudes into the water receiving tray 42. Furthermore, the water spray box 51 assembled onto the gas-liquid contact member 53 is in contact with the tip of the air guide plate 38. Therefore, air which is passed through the space 1A by the air blowing fan 31 is led to the gas-liquid contact member 53 by the air guide plate 38, and passes through the gas-liquid contact member 53.

The gas-liquid contact member 53 is a filter member having a honeycomb structure. Specifically, the gas-liquid contact member 53 is designed so that an element portion coming into contact with gas is supported by a frame. The element portion is constructed by laminating corrugated plate type corrugated plate members and flat plate type flat-plate members, and many substantially-triangular openings are formed between each corrugated plate member and each flat-plate member. Accordingly, the gas-liquid contact area when air is passed through the element portion can be kept broad, electrolytic water can be dropped through the element portion and clogging hardly occurs.

Furthermore, a water distributing sheet (not shown) is disposed in the gas-liquid contact member 53 to efficiently dispersing the electrolytic water dropped from the water spray box 51 to the element portion. This water distributing sheet is formed of fiber material having liquid permeability (woven fabric, non-woven cloth or the like), and one or plural water distributing sheets are provided along the cross-section in the thickness direction of the gas-liquid contact member 53.

Furthermore, the gas-liquid contact member 53 and the water supply tank 41 are partitioned from each other by a partition plate 36. The partition plate 36 blocks off the sides of the space 1A and the gas-liquid contact member 53 so that air can be smoothly passed through the gas-liquid contact member 53.

Here, each part of the gas-liquid contact member 53 (containing the frame, the element portion and the water distributing sheet) is formed of material which is little deteriorated by electrolytic water, such as polyolefin type resin (polyethylene resin, polypropylene resin or the like), PET (polyethylene terephthalate) resin, vinyl chloride resin, fluorinated resin (PTFE, PFA, ETFE or the like), ceramics type material or the like. PET resin is used in this embodiment and other embodiments described later.

Each part of the gas-liquid contact member 53 is subjected to a water affinity treatment so that the affinity to electrolytic water is enhanced. Therefore, water retentivity (wettability) of electrolytic water of the gas-liquid contact member 53 is kept, and the contact between active oxygen species (active oxygen materials) described later and indoor air can be maintained for a long time. Furthermore, electrolytic water having mildewproof property is dropped to the gas-liquid contact member 53, and thus breeding of molds can be avoided without subjecting any mildewproof countermeasure (coating of mildewproof agent or the like) to the gas-liquid contact member 53.

Air passing through the gas-liquid contact member 53 passes through an air blow-out port filter 35 disposed below the air blow-out port 13 and then exhausted.

The air blow-out port filter 35 is a filter for preventing foreign materials from invading from the air blow-out port 13 into the housing 11. The air blow-out port filter 35 has a mesh, woven fabric, non-woven cloth or the like, and it is formed of synthetic resin, preferably the same material as the gas-liquid contact member 53. It is preferable that the air blow-out port filter 35 has a properly coarse mesh so that the air flow resistance to air passing through the gas-liquid contact member is not remarkably increased.

A louver 20 (lid member) is disposed at the air blow-out port 13 provided to the housing 11. The louver 20 comprises an upper plate 21 having such a size that it can close the air blow-out port 13, a lower plate 22 which is disposed below the upper plate in parallel to the upper plate 21, and joint portions 23 for joining the upper plate 21 and the lower plate 22. Each joint portion 23 is a flat-plate member provided to each of the right and left end portions of the upper plate 21 and the lower plate 22, and a pin 24 is erected from each joint portion 23. The two pins 24 are projected from both the side ends of the louver 20 to the housing 11 side, and they are fitted in receiving portions (not shown) provided to the lateral sides of the air blow-out port 13 to support the louver 20.

The two pins 24 are freely rotatably supported by the receiving portions, and joined to a louver driving motor 68 (FIG. 8). The pins 24 are driven by the louver driving motor 68, whereby the louver 20 turns.

Under the state that the louver 20 is kept substantially in parallel to the top face of the housing 11, the air blow-out port 13 is substantially fully closed by the upper plate 21. This state is referred to as "close state". On the other hand, the state that the louver 20 is inclined with respect to the top face of the housing 11 is referred to as "open state".

Under the open state of the louver 20, air passing through the gas-liquid contact member 53 can be discharged to the air blow-out port 13. Here, the air discharged from the air blow-out port 13 is discharged along the upper and lower plates 21 and 22 of the louver 20. Therefore, the exhaust direction of the air filtering apparatus 1 can be adjusted by changing the angle of the louver 20.

Furthermore, the louver 20 is designed in such a double vane structure that the upper and lower plates 21 and 22 are arranged in parallel so as to be spaced from each other at a predetermined interval. Therefore, it has an action of rectifying air blown out from the air blow-out port 13, and thus there is an advantage that air exhaust can be smoothly performed in conformity with the angle of the louver 20.

Furthermore, if the louver 20 is set to the close state under the state that the fan motor 32 is stopped, the air in the housing 11 hardly leaks to the outside of the apparatus. Therefore, as described later, when ozone is generated in the electrolytic bath 46 or active oxygen species of a high concentration are generated, odor inherent to these materials is prevented from leaking to the outside. Therefore, there is an advantage that ozone or active oxygen species of high concentration can be used while the atmosphere of the room in which the air filtering apparatus is set up can be kept comfortable.

Figure 7A:
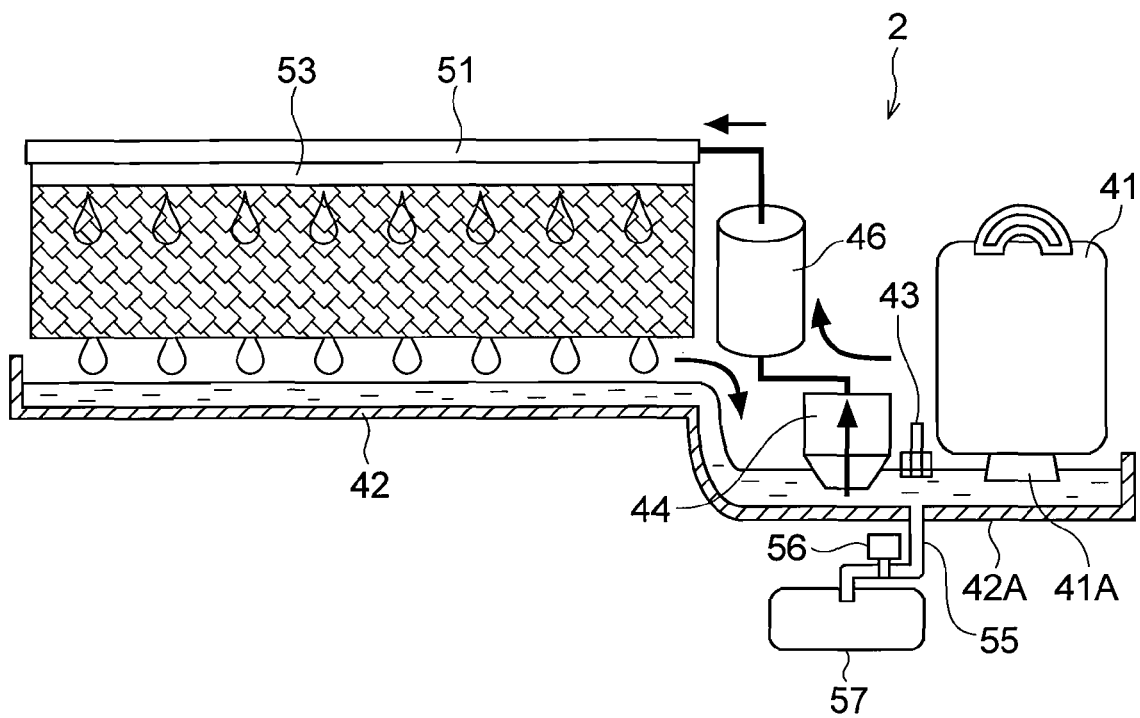
Figure 7B:
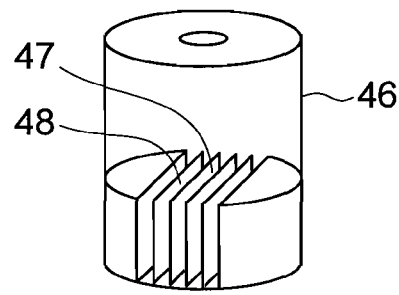

FIGS. 7A and 7B are diagrams showing the water circulating unit of electrolytic water in the air filtering apparatus of FIG. 1 and an aspect of supplying electrolytic water by the water circulating unit, wherein FIG. 7A is a schematic diagram showing the construction of the electrolytic water circulating unit 2 and FIG. 7B is a diagram showing the details of the construction of the electrolytic bath 46.

The supply of the electrolytic water to the gas-liquid contact member 53 will be described with reference to FIGS. 7A and 7B. In this embodiment, a case where tap water is poured into the water supply tank 41 and the air filtering apparatus 1 is operated will be described.

When the water supply tank 41 filled with tap water is set in the air filtering apparatus 1, tap water is supplied from the water supply tank 41 into the water receiving tray 42 as described above, and the water level of the water receiving tray 42 reaches a predetermined level. The water in the water receiving tray 42 is sucked up by the circulating pump 44 and supplied to the electrolytic bath 46.

As shown in FIG. 7B, the electrolytic bath 46 has two pairs of electrodes 47, 48, and a voltage is applied between the respective electrodes 47, 48, whereby water flowing in the electrolytic bath 46 is electrolyzed and electrolytic water containing active oxygen species is generated.

Here, the active oxygen species means oxygen molecules having higher oxidizing activity than normal oxygen and also related substance thereof, and contain not only so-called narrowly-defined active oxygen such as superoxide anion, singlet oxygen, hydroxyl radical and hydrogen peroxide, but also so-called broadly-defined active oxygen such as ozone, hypochlorous acid, hypohalous acid, etc.

The electrolytic bath 46 is disposed in proximity to the gas-liquid contact member 53, and active oxygen species generated by electrolyzing tap water are immediately supplied to the gas-liquid contact member 53.

The electrode 47 is an electrode plate which includes a base of Ti (titan) and a coating layer of Ir (Iridium), Pt (Platinum), and when positive potential is applied to the electrode 47 as an anode from an external power source, hypochlorous acid is generated as active oxygen species.

The electrode 48 is an electrode plate which includes a base of Ti (titan) and a coating layer of Pt (Platinum), tantalum (Ta), and when positive potential is applied to the electrode 48 as an anode from the external power source, ozone is generated as active oxygen species.

When a voltage is applied between the electrode 47 and the electrode 48 while the electrode 47 is set as an anode and the electrode 48 is set as a cathode, hydrogen ions ($H^+$) and hydroxide ions ($OH^-$) in water react with each other at the electrode 48 as the cathode as indicated by the following reaction formula (1):

$$4H^+ + 4e^- + (4OH^-) \rightarrow 2H_2 + (4OH^-) \tag{1}$$

Furthermore, at the electrode 47 as the anode (positive electrode), water is electrolyzed as indicated by the following reaction formula:

$$2H_2O \rightarrow 4H^+ + O_2 + 4e^- \tag{2}$$

At the same time, at the electrode 47, chlorine ions ($Cl^-$) contained in water react according to the following reaction formula (3):

$$2Cl^- \rightarrow Cl_2 + 2e^- \tag{3}$$

Furthermore, chlorine reacts with waster as indicated by the following reaction formula (4), and hypochlorous acid (HClO) and hydrogen chloride (HCl) are generated.

$$Cl_2 + H_2O \rightarrow HClO + HCl \tag{4}$$

hypochlorous acid generated at the electrode 47 contains the broadly-defined active oxygen species, and has strong oxidizing action and bleaching action. Water solution in which hypochlorous acid is dissolved, that is, electrolytic water generated by the air filtering apparatus 1 exerts various air cleaning effects such as inactivation of virus, etc., sterilization, decomposition, etc. of organic compounds.

When a voltage is applied between the electrode 47 and the electrode 48 from the external power source to supply current between the electrodes wile the electrode 47 is set as the cathode and the electrode 48 is set as the anode, reactions indicated by the following reaction formulas (5) to (7) occur at the electrode 48 as the anode and ozone is generated:

$$2H_2O \rightarrow 4H^+ + O_2 + 4e^- \quad (5)$$

$$3H_2O \rightarrow O_3 + 6H^+ + 6e^- \quad (6)$$

$$2H_2O \rightarrow O_3 + 4H^+ + 4e^- \quad (7)$$

On the other hand, at the electrode 47 as the cathode, the reactions indicated by the following reaction formulas (8) and (9) occur, and $O^{2-}$ generated by the electrode reaction and $H^+$ in water are bonded to each other to generate hydrogen peroxide ($H_2O_2$).

$$4H^+ + 4e^- + (4OH^-) \rightarrow 2H_2 + (4OH^-) \quad (8)$$

$$O^{2-} + e^- + 2H^+ \rightarrow H_2O_2 \quad (9)$$

As described above, in the construction of this embodiment, the voltage is applied between the electrodes 47 and 48 from the external power source so that the electrode 47 is set to the positive potential, thereby generating hypochlorous acid having strong sterilization force from the electrode 47 side and thus generating electrolytic water containing hypochlorous acid.

Furthermore, by applying the voltage between the electrodes 47, 48 from the external power source so that the electrode 48 is set to the positive potential, ozone having strong sterilization force is generated form the electrode 48 side while hydrogen peroxide is generated from the electrode 47 side, thereby generating electrolytic water containing ozone and hydrogen peroxide.

In the case where hypochlorous acid having strong sterilization is generated by the electrodes 47, 48, when the electrolytic water containing this hypochlorous acid is dropped from the water spray box 51 to the gas-liquid contact member 53, air blown out from the air blowing fan 31 comes into contact with hypochlorous acid in the gas-liquid contact member 53, whereby virus, etc. floating in the air is inactivated, and also odor materials contained in the air react with hypochlorous acid, so that the odor materials are decomposed or ionized and dissolved. Accordingly, air filtering (inactivation, sterilization or the like of virus, etc. in the air) and deodorization are performed and thus purified air is discharged from the gas-liquid contact member 53.

When ozone and hydrogen peroxide are generated by the electrodes 47 and 48, the air blown out by the air blowing fan 31 comes into contact with ozone and hydrogen peroxide in the gas-liquid contact member 53, whereby the virus, etc. floating in the air is inactivated and also the odor materials contained in the air react with ozone and hydrogen peroxide, so that the odor materials are decomposed or ionized and dissolved. Accordingly, the air filtering and deodorization are performed, and the cleaned air is discharged from the gas-liquid contact member 53.

The inactivating action of virus, etc. by the active oxygen species will be described by exemplifying influenza virus. The active oxygen species described above function to break down and vanish (remove) the surface protein (spike) of the virus concerned which is indispensable for infection. When the surface protein of influenza virus is broken down, the influenza virus is not joined to a receptor which is necessary for infection of the virus concerned, so that infection can be prevented. Therefore, the influenza virus floating in the air lose its infection force by coming into contact with the electrolytic water containing the active oxygen species in the gas-liquid contact member 53, thereby preventing infection.

Accordingly, even when the air filtering apparatus 1 is set up in a so-called large space such as a kindergarten, an elementary/junior high/high school, long-term care insurance facilities, a hospital or the like, indoor air which comes into contact with the electrolytic water to be cleaned (sterilized, deodorized or the like) can be blown out far away in the large space, so that sterile filtration and deodorization of air can be efficiently performed in the large space.

Here, switching operation of the electrode to apply the positive potential to any side of the electrodes 47, 48 in the electrolytic bath 46 can be performed by inverting the polarities of the electrodes. In this embodiment, the switching operation can be performed by changing (inverting) the voltage applied to the electrodes 47, 48 by a controller 60 (FIG. 8) described later.

Furthermore, the concentration of the active oxygen species in the electrolytic water is adjusted so as to inactivate virus, etc. to be filtered. The adjustment of the concentration of the active oxygen species is carried out by adjusting the voltage applied between the electrodes 47 and 48 to adjust the current value flowing between the electrode 47 and the electrode 48.

For example, when the positive potential is applied to the electrode 47 and the current value flowing between the electrode 47 and the electrode 48 is set to 20 mA (milliampere)/$cm^2$ (square centimeter) in current density, a desired free residual chlorine concentration (for example, 1 mg (milligram)/l (liter)) is generated. Furthermore, by changing the voltage applied between the electrodes 47 and 48 to increase the current value, the concentration of hypochlorous acid in electrolytic water can be increased. With respect to ozone or hydrogen peroxide in electrolytic water, the concentration of ozone or hydrogen peroxide in electrolytic water can be likewise increased by applying the positive potential to the electrode 48 and increasing the current value flowing between the electrode 47 and the electrode 48.

In this embodiment, as described above, tap water is supplied from the water supply tank 41. The tap water contains chlorine compounds for the purpose of sterilization, and thus it contains chloride ions. The chloride ions react as indicated by the reaction formulas (3) and (4), and hypochlorous acid and hydrochloric acid aregenerated. This is not limited to the case where tap water is used. Insofar as water supplied to the electrolytic bath 46 contains halide ions due to addition or contamination of halide, active oxygen species containing halogen are generated by the same reactions as the reaction formulas (3) and (4).

In the air filtering apparatus, the same reactions can be induced in a case where water containing dilute ion species (deionized water, purified water, well water, some kind of tap water or the like). That is, if halogen compound (salt or the like) is added to water containing dilute ion species, the same reactions as the reactions (3) and (4) occur and active oxygen species can be achieved. That is, the air filtering apparatus 1 can exert a sufficient air cleaning effect (inactivation, sterilization, deodorization or the like of virus, etc.) without using tap water containing a sufficient amount of chlorine compounds, but by using other kinds of water.

In this case, a chemical (halogen compound or the like) may be supplied to water to be introduced into the electrolytic bath 46). For example, a medical agent supply apparatus for supplying the chemical may be provided to the air filtering apparatus 1. The chemical supply apparatus may be designed to inject a chemical into the water receiving tray 42 or directly inject a chemical into the electrolytic bath 46. Furthermore, it may be designed to inject a chemical into the water supply tank 41, or a chemical whose concentration is adjusted may be stocked in the water supply tank 41.

Here, salt or salt solution may be used as the chemical. For example, if the concentration of salt solution in the electrolytic bath 46 is set to about 2 to 3% (weight %), electrolytic water (0.5 to 1%) containing hypochlorous acid or hydrogen peroxide can be generated by electrolyzing salt solution in the electrolytic bath 46. According to this construction, even when the ion species in the water to be introduced into the electrolytic bath 46 is dilute, the amount of the ion species can be increased by adding salt or salt solution, whereby active oxygen species can be generated highly efficiently and stably in the electrolysis process of water.

The electrolytic water dropped from the water spray box 51 to the gas-liquid contact member 53 moves downwardly through the gas liquid contact member 53, and drops to the water receiving tray 42. The electrolytic water dropping to the water receiving tray 42 is sucked by the circulating pump 44, passed through the electrolytic bath 46 and then supplied to the gas-liquid contact member 53. As described above, in the construction of this embodiment, water is supplied on the basis of a water circulation system. Therefore, air filtering can be efficiently performed for a long time by effectively using a small amount of water. Furthermore, when the amount of circulated water is reduced due to vaporization or the like, a proper amount of water is supplied from the water supply tank 41 into the water receiving tray 42.

Furthermore, in the air filtering apparatus 1, water stocked in the water receiving tray 42 can be suitably discharged.

As shown in FIGS. 2 to 7, a tank-like drain receiver 57 having a predetermined depth and an opening at the upper portion thereof is disposed below the water stock portion 42A. The drain receiver 57 is mounted on the support plate 37 (see FIG. 2), and it can be taken in and out through the drain receiver take-out port 15 (FIG. 1) of the housing 11. Furthermore, the drain pipe 55 is joined to the water stock portion 42A of the water receiving tray 42, and a drain valve 56 (water stop valve) for opening/closing the drain pipe 55 is provided to the drain pipe 55. The tip of the drain pipe 55 extends downwardly, and intrudes from the opening of the drain receiver 57 into the drain receiver 57.

The bottom surface of the water stock portion 42A is opened at the joint portion to the drain pipe 55 so that water in the water stock portion 42A flows out to the drain pipe 55. The drain pipe 55 extends downwardly from the water stock portion 42A. Therefore, the drain valve 56 is opened under the control of the controller 60 (FIG. 8), whereby the water in the water receiving tray 42 passes through the drain pipe 55 and drops to the drain receiver 57. As described above, the opening/closing of the drain valve 56 is controlled by using the drain pipe 55 branched from the electrolytic water circulating unit 2, whereby the water of the electrolytic water circulating unit 2 can be withdrawn/discharged by the drain receiver 57. Furthermore, the drain receiver 57 is provided with a grip 57A so as to make it easy to carry the drain receiver 57, and it can be easily taken in/out through the drain receiver take-out port 15 (FIG. 1).

FIG. 8 is a functional block diagram showing the construction of the control system for the air filtering apparatus 1.

As shown in FIG. 8, the fan motor 32, the circulating pump 44, the drain valve 56, the louver driving motor 68 for opening/closing the louver 20 and the power supply unit 67 for supplying power to the respective parts are connected to the controller 60, and operated according to the control of the controller 60.

Furthermore, various kinds of switches, an indicator lamp, etc. disposed on an operating panel 16 are connected to the controller 60, and the water receiving tray float switch 43, the electrodes 44 and 48 and an electrolytic bath float switch 66 for detecting the water level in the electrolytic bath 46 are connected to the controller 60.

The controller 60 is equipped with a microcomputer 61 for controlling the whole of the air filtering apparatus 1, a storage portion 62 for storing control programs executed by the microcomputer 61 and data such as control parameters, etc., a timer counter 63 for carrying out a time counting operation on the basis of the control of the microcomputer 61, an input portion 64 for detecting the operation of the operating panel 16 and outputting an operation content to the microcomputer 61, and an output portion 65 for outputting the processing result of the microcomputer 61 by controlling turn-on of the indicator lamp (not shown) of the operating panel 16.

The microcomputer 61 reads the control programs stored in the storage portion 62 in advance to execute the control programs, and also reads the control parameters stored in the storage portion 62 to operate the respective parts of the air filtering apparatus 1.

Specifically, when an operation of instructing start of the operation in the operation panel is carried out and information indicating this operation is input from the input portion 64, the microcomputer 61 operates the circulating pump 44 to start water circulation, and also applies a voltage to the electrodes 47, 48 to generate electrolytic water. Furthermore, the microcomputer 61 operates the louver driving motor 68 to set the louver 20 to the open state, and then starts the operation of the fan motor 32 to start air blowing of the air blowing fan 31. Through the series of operations described above, the air filtering operation of the air filtering apparatus 1 is started. In connection with the air filtering operation, the microcomputer 61 makes the output portion 65 indicate that the apparatus is under operation.

Furthermore, the microcomputer 61 controls the timer counter 63 to start the count of the operation time in connection with the start of the air filtering apparatus. The timer counter 63 can accumulatively count the operation time, and even when the air filtering apparatus 1 stops the air filtering operation, the timer counter 63 sequentially count the operation time without resetting the count value at the time when the air filtering operation is resumed.

During execution of the air filtering operation, the microcomputer 61 judges the concentration of the electrolytic water (the concentration of the active oxygen species) in the electrolytic bath 46 on the basis of the electrical conductivity between the electrodes 47 and 48, and properly adjusts the voltage applied between the electrodes 47 and 48. Furthermore, during execution of the air filtering operation of the air filtering apparatus 1, when it is detected by the electrolytic bath float switch 66 that the water level in the electrolytic bath 46 is equal to a low water level and also when it is detected by the water receiving tray float switch 43 that the water level of the water receiving tray 42 is equal to a low water level, the microcomputer 61 stops the application of the voltage to the electrodes 47, 48, stops the operation of the circulating pump 44 and the fan motor 32, and controls the output portion 65 to indicate a warning.

Furthermore, when the operation of instructing the stop of the operation is carried out on the operating panel and the information indicating this operation is input from the input portion 64, the microcomputer 61 stops the application of the voltage to the electrodes 47 and 48 and also stops the circulating pump 44. Furthermore, the microcomputer 61 stops the fan motor 32 so that the air blowing of the air blowing fan 31 is stopped, and then operates the louver driving motor 68 to set the louver 20 to the close state. Through the series of operations, the air filtering operation of the air filtering apparatus 1 is stopped. At this stop time of the air filtering operation, the microcomputer 61 stops the output portion 65 to indicate that the apparatus is under operation, and also stops the counting of the operation time of the timer counter 63.

Furthermore, when the air filtering operation of the air filtering apparatus 1 reaches a constant time, that is, the count value of the timer counter 63 reaches a preset value, the microcomputer 61 executes a water exchange operation of discharging the water of the water receiving tray 42 to the drain receiver 57.

Next, the operation of the air filtering apparatus 1 will be described while concentrating on the water exchange operation.

Figure 9:
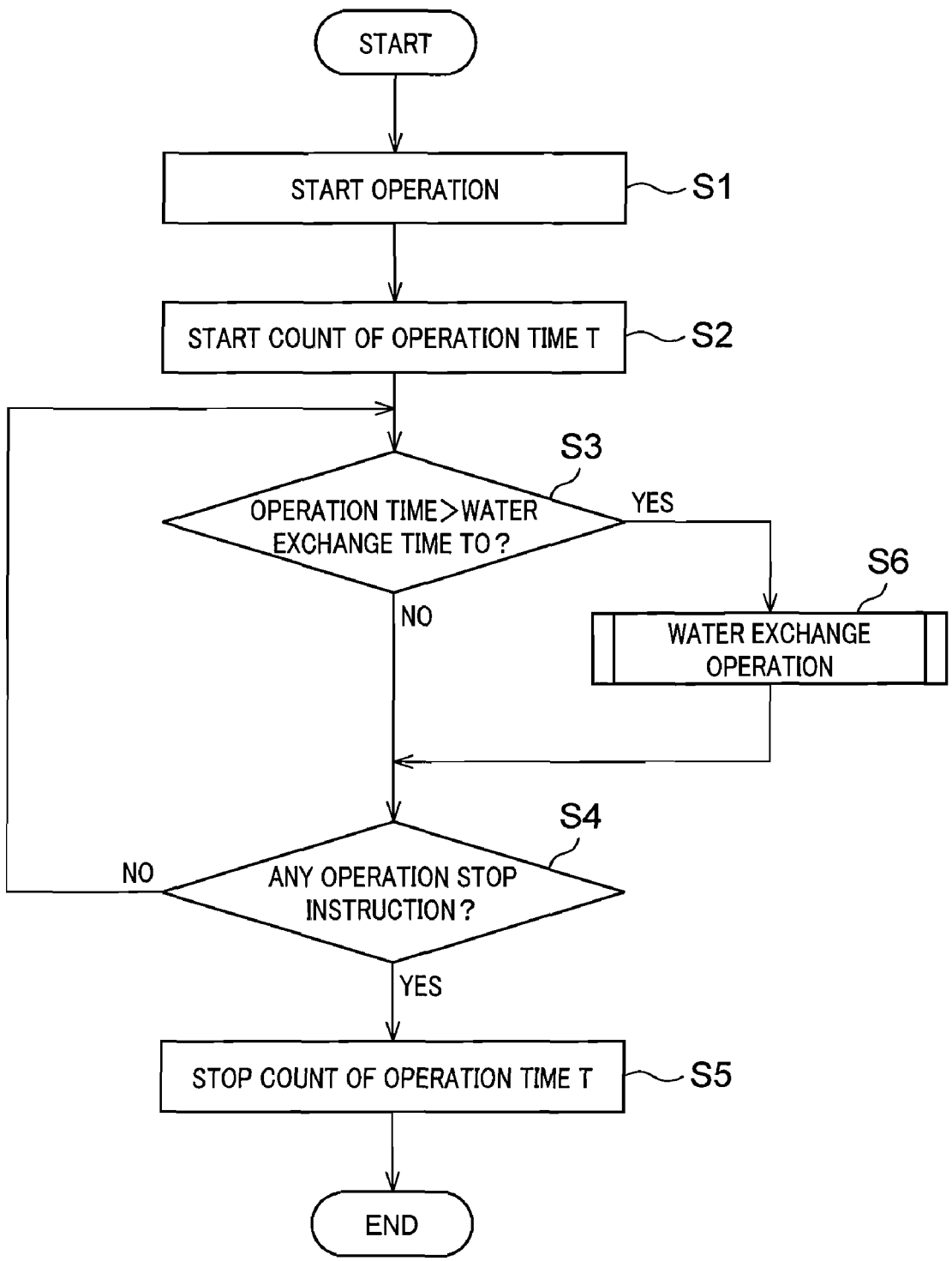
FIG. 9 is a flowchart showing the operation of the air filtering apparatus of FIG. 8.

FIG. 9 is a flowchart showing the operation of the air filtering apparatus 1. During execution of the operation shown in FIG. 9, the microcomputer 61 functions as the controller, and the timer counter 63 functions as the time counting portion.

When the start of the operation is instructed by the operation of the operating panel, the microcomputer 61 controls the respective parts of the air filtering apparatus 1 as described above, and starts the air filtering operation (step S1). In connection with the start of the air filtering operation, the microcomputer 61 controls the timer counter 63 to start the counting of an operation time T (step S2).

During air filtering operation, the microcomputer 61 judges whether the count value of the operation time T by the timer counter 63 exceeds a preset water exchange time T0 or not (step S3). If the count value does not exceed the water exchange time T0, the judgment is sequentially continued until there is an instruction of stopping the operation (step S4). If the stop of the air filtering operation is instructed by the operation of the operating panel 16 (step S4; YES), the microcomputer 61 controls the timer counter 63 to stop the count of the operation time T (step S5), and stops the air filtering operation of the air filtering apparatus 1 as described above, so that the microcomputer 61 shifts to a stand-by state.

If the count value of the operation time T by the timer counter 63 exceeds the preset water exchange time T0 (step S3; Yes), the microcomputer 61 executes the water exchange operation (step S6). The details of the water exchange operation will be described later with reference to FIG. 10. When the water exchange operation is finished, the microcomputer 61 shifts to the operation of the step S4.

Figure 10:
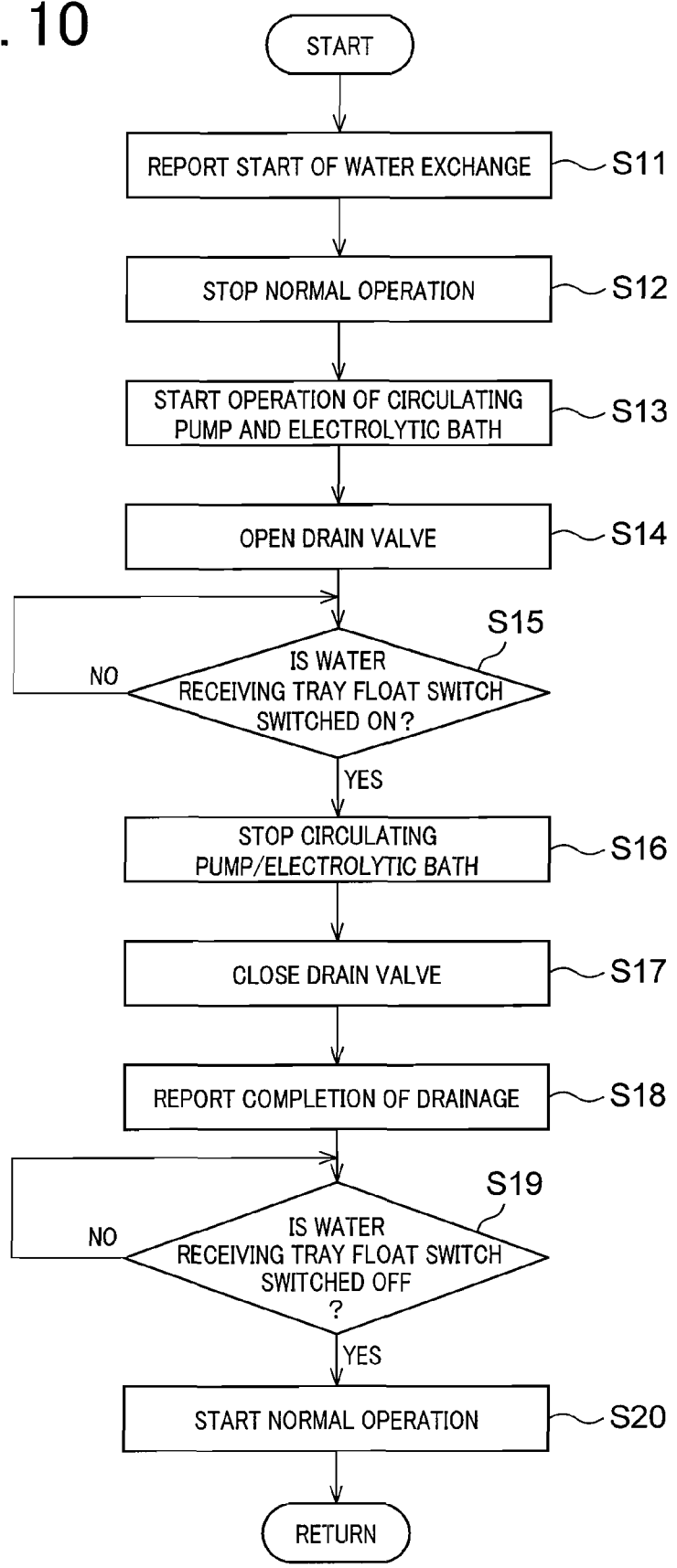
FIG. 10 is a flowchart showing an water exchange operation executed in the air filtering apparatus of FIG. 8.

FIG. 10 is a flowchart showing the details of the water exchange operation indicated by step S6 of FIG. 9.

In connection with the start of the water exchange operation, the microcomputer 61 controls the output portion 65 to inform the start of the water exchange operation by the indicator lamp of the operating panel 16 (step S11), and stops the normal air filtering operation (step S12).

Subsequently, the microcomputer 61 starts the operation of the circulating pump 44, and also starts current supply to the electrodes 47, 48 of the electrolytic bath 46 (step S13). In this step S13, the fan motor 32 is kept stopped. Furthermore, the microcomputer 61 opens the drain valve 56 and discharges the water in the water receiving tray 42 to the drain receiver 57 (step S14).

After the drain valve 56 is opened, the microcomputer 61 monitors the state of the water receiving float switch 43 disposed in the water stock portion 42A (step S15). As described above, the water receiving tray float switch 43 is switched on when the water level of the water stock portion 42A is lower than the predetermined level. Therefore, when the water receiving tray float switch 43 is switched on, the water level of the water receiving tray 42 is lower than the predetermined level, and most of the water in the electrolytic water circulating unit 2 is discharged to the drain receiver 57.

Furthermore, when water remains in the water supply tank 41 at the start time of the water exchange operation, the water level of the water receiving tray 42 is not lowered during the time when water is supplied from the water supply tank 41 in connection with the discharge of the water of the water receiving tray 42. Accordingly, when the water receiving tray float switch 43 is switched on, the water in the water supply tank 41 is sufficiently discharged.

When the water receiving tray float switch 43 is switched on (step S15; Yes), the microcomputer 61 stops the current supply to the electrodes 47, 48, stops the circulating pump 44 and also closes the drain valve 56 (step S17).

The microcomputer 61 controls the output portion 65 to informs completion of the drainage by the indicator lamp of the operating panel 16 or the like, sends a user a guidance indicating that water should be supplemented to the water supply tank 41 (step S18), and monitors the state of the water receiving tray float switch 43 (step S19).

When the water supply tank 41 supplemented with water is set in the air filtering apparatus 1, the water is supplied from the water supply tank 41 to the water receiving tray 42, and the water receiving tray float switch 43 is switched off. Therefore, the microcomputer 61 starts the normal operation (step S20) when it is detected that the water receiving tray float switch 43 is switched off (step S19; Yes).

As described above, the air filtering apparatus 1 is designed so that water is electrolyzed in the electrolytic bath 46 to generate electrolytic water, the generated electrolytic water is dropped from the upper side of the gas-liquid contact member 53 and air is blown to the gas-liquid contact member 53 by the air blowing fan 31. Furthermore, the air filtering apparatus 1 is provided with the electrolytic water circulating unit 2 for receiving and stocking the electrolytic water dropped from the gas-liquid contact member 53 in the water receiving tray 42, pumping up the stocked electrolytic water and supplying the electrolytic water to the electrolytic bath 46 by the circulating pump 44, and then dropping the electrolytic water to the gas-liquid contact member 53. Furthermore, the electrolytic water circulated in the electrolytic water circulating unit 2 is discharged to the drain receiver 57. Therefore, the electrolytic water circulated in the electrolytic water circulating unit can be easily discharged and water exchange can be simply performed. Accordingly, the air filtering apparatus for which the maintenance can be easily performed can be implemented and the inside of the air filtering apparatus 1 can be kept clean with a small labor.

Furthermore, the electrolytic water discharged to the drain receiver 57 can be used as cleaning water or the like. In this case, virus, etc. and allergy materials adhering to the floor surface, etc. can be suppressed. The electrolytic water having the air filtering performance can be effectively used in applications other than the air filtering.

The drain pipe 55 intercommunicates with the water stock portion 42 which is formed so as to have a deeper bottom in the water receiving tray 42, and extends to the drain receiver 57 located at the lower side of the water receiving tray 42. Therefore, when the drain valve 56 is set to the open state, the electrolytic water in the water receiving tray 42 naturally flows down to the water receiver 57 by gravitational force. Therefore, the electrolytic water can be surely discharged with a simple construction. Furthermore, the discharge state of the electrolytic water can be monitored by monitoring the state of the water receiving tray float switch 43 disposed in the water stock portion 42A by the controller 60.

Furthermore, the water supply port 41A of the water supply tank 41 for supplying water to the electrolytic water circulating unit 2 is opened to the water receiving tray 42, and thus the water in the water supply tank 41 is supplied in connection with the lowering of the water level of the water receiving tray 42. Therefore, when water remains in the water supply tank 41 at the start time of the water exchange operation, water is newly supplied from the water supply tank 41 in connection with the discharge of the water of the water receiving tray 42. Therefore, the electrolytic bath 46, the water spray box 51, the gas-liquid contact member 53 and the water receiving tray 42 are cleaned by the water remaining in the water supply tank 41. Accordingly, not only water is exchanged, but also the electrolytic water circulating unit 2 can be cleaned.

Furthermore, the microcomputer 61 of the controller 60 carries out the water exchange operation of opening the drain valve 56 and discharges water to the drain receiver 57 every time the operation time counted by the timer counter 63 reaches a predetermined time. Therefore, the water exchange can be performed periodically, and also the water exchange timing can be automatically controlled.

As described above, the air filtering apparatus 1 can switch a first operation of generating first electrolytic water containing hypochlorous acid in the electrolytic bath 46 and a second operation of generating second electrolytic water containing ozone and hydrogen peroxide to each other by inverting the potentials (polarities) of the electrodes 47 and 48. Therefore, under the water exchange operation, the water in the electrolytic water circulating unit 2 may be discharged to the drain receiver 57 after the electrodes are inverted. This case will be described hereunder in detail.

Figure 11:
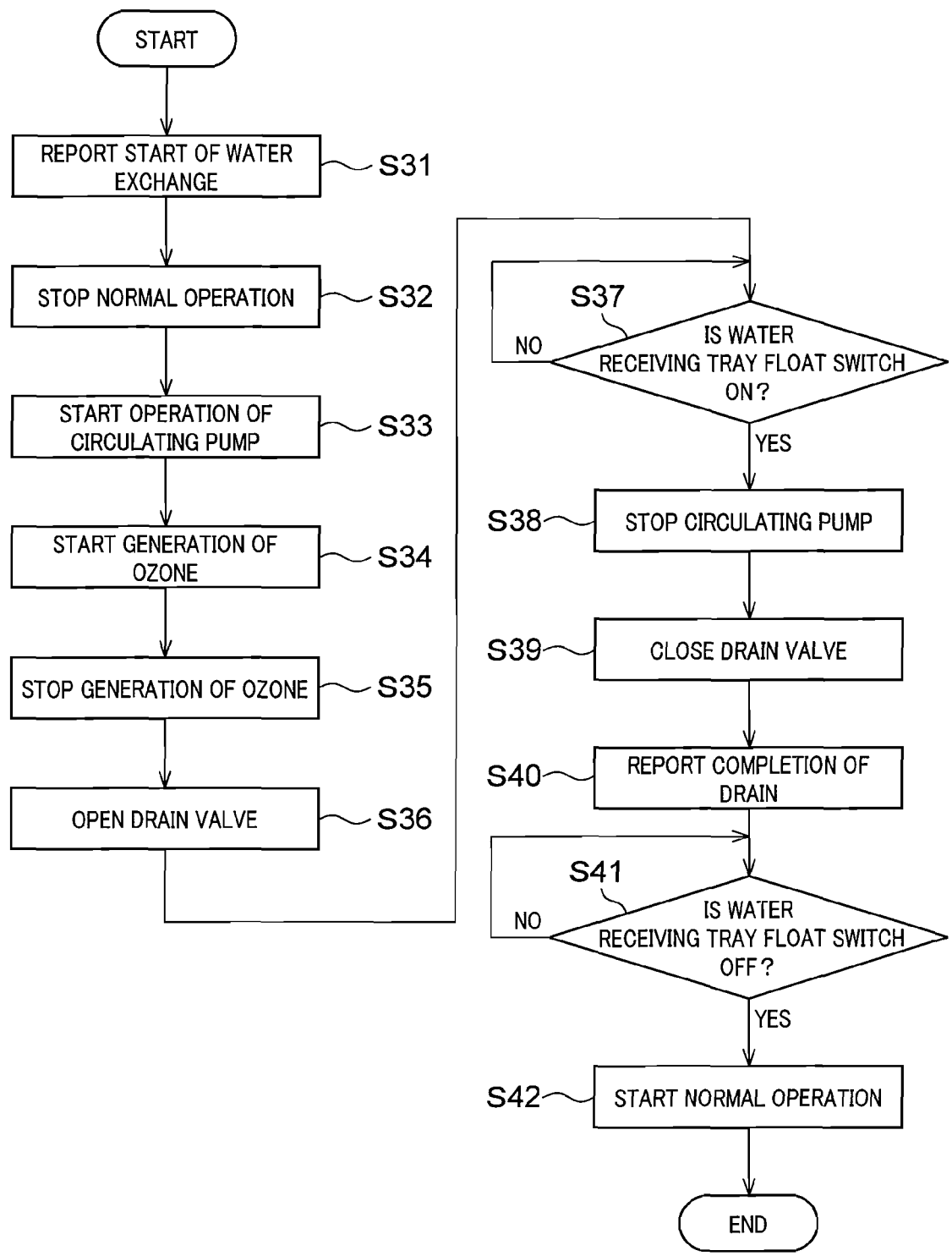
FIG. 11 is a flowchart showing the details of a modification of the water exchange operation of FIG. 10.

FIG. 11 is a flowchart showing the details of another example of the water exchange operation indicated by the step S6 of FIG. 9. In an embodiment of FIG. 11, the water exchange operation is carried out while the potentials (polarities) of the electrodes are inverted in the air filtering apparatus 1.

In this water exchange operation, the microcomputer 61 controls the output portion 65 to report the start of the water exchange by the indicator lamp of the operating panel 16 or the like (step S31), and stops the normal air filtering operation (step S32).

Subsequently, the microcomputer 61 starts the operation of the circulating pump 44 (step S33) and stats current supply to the electrodes 47, 48 of the electrolytic bath 46 to generate electrolytic water containing ozone and hydrogen peroxide (step S34). In this step S34, the microcomputer 61 applies a voltage between the electrodes 47 and 48 to supply current to the electrodes while the electrode 47 is set as the cathode and the electrode 48 is set as the anode, whereby ozone is generated at the electrode 48 as the anode and hydrogen peroxide is generated at the electrode 47 as the cathode.

Here, when ozone is generated in the electrolytic bath 46, a minute amount of ozone may leak from the electrolytic bath 46 to the outside or a minute amount of ozone may vaporize from electrolytic water discharged from the electrolytic bath 46. Ozone has gas having peculiar odor. Therefore, when odor of ozone leaks to the outside of the housing 11, it may makes users have uncomfortable feeling. Odor of ozone is particularly strong and thus users sense the odor even when the amount of ozone is small to the extent that it does not affect human bodies.

Therefore, in step S34, the current supply in the electrolytic bath 46 and the driving of the circulating pump 44 are started, however, the louver 20 is kept under the close state and the fan motor 32 is kept stopped. Accordingly, the odor of ozone hardly leaks to the outside of the air filtering apparatus 1, and the atmosphere of the room where the air filtering apparatus 1 is set up can be kept comfortable.

After a predetermined time elapses from the time when the current supply to the electrodes 47, 48 of the electrolytic bath 46 is started in step S34, the microcomputer 61 stops the current supply to the electrodes 47, 48 (step S35). Electrolytic water containing ozone and hydrogen peroxide is circulated in the electrolytic water circulating unit 2 during the time period from the step S34 to the step S34.

Thereafter, the microcomputer 61 opens the drain valve 56 and discharges water in the water receiving tray 42 to the drain receiver 57 (step S34).

After the drain valve 56 is opened, the microcomputer 61 monitors the state of the water receiving tray float switch 43 disposed in the water stock portion 42A (step S37). When the water receiving tray float switch 43 is switched on (step S37; Yes), the microcomputer 61 judges that the water in the air filtering apparatus 1 which contains the water in the water supply tank 41 is sufficiently drained to the drain receiver 57, and thus it stops the circulating pump 44 (step S38) and closes the drain valve 56 (step S39).

Then, the microcomputer 61 controls the output portion 65 to report the completion of the drain by the indicator lamp of the operating panel 16 or the like, gives the user a guidance indicating that water should be supplemented to the water supply tank 41 (step S40) and monitors the state of the water receiving tray float switch 43 (step S41).

When the water supply tank 41 supplemented with water is set in the air filtering apparatus 1, water is supplied from the water supply tank 41 to the water receiving tray 42, and the water receiving tray float switch 43 is switched off. Therefore, the microcomputer 61 starts the normal operation (step S42) when it is detected that the water receiving tray float switch 43 is switched off (step S41; Yes).

As described above, by generating electrolytic water containing ozone and circulating the electrolytic water in the electrolytic water circulating unit 2 under the water exchange operation, the respective parts of the electrolytic water circulating unit 2 are sterilized/deodorized by strong oxidation action of ozone and thus these parts can be kept clean.

Furthermore, under the normal operation, electrolytic water containing hypochlorous acid is generated in the electrolytic bath 46, and under the water exchange operation, the polarities of the electrodes are inverted and electrolytic water containing ozone and hydrogen peroxide is generated in the electrolytic bath 46. Therefore, the respective parts of the electrolytic water circulating unit 2 are cleaned by the active oxygen species which are different from the active oxygen species generated under the normal operation. Therefore, the cleanliness of the electrolytic water circulating unit 2 can be more surely kept, and the labor of cleaning the respective parts of the air filtering apparatus 1 can be greatly reduced. Furthermore, if the current supply to the electrodes 47 and 48 is controlled so that the concentration of active oxygen species under water exchange operation is set to be higher than that under the normal operation, a higher cleaning effect can be expected.

Furthermore, according to the construction of this embodiment, by inverting the polarities of the electrodes, the type of the active oxygen species contained in the electrolytic water can be easily switched (changed) to another type, and thus the construction of the air filtering apparatus 1 is not complicated.

Still furthermore, by inverting the polarities of the electrodes 47 and 48, scales deposited on the cathode under the normal operation are exfoliated/drop out from the electrodes. That is, under the normal operation, scales (for example, calcium-based scales such as calcium carbonate, etc., and magnesium-based scales such as magnesium carbonate, etc.) derived from inorganic materials (containing ions) contained in water to be introduced to the electrolytic bath 46 are deposited on the electrode surface at the cathode. When scales are deposited on an electrode, the electrical conductivity is lowered, and thus it is difficult to perform continual electrolysis. According to this embodiment, by inverting the polarities of the electrodes under the water exchange operation, the scales deposited on the electrodes drop out, and these scales are pushed out by water circulated in the electrolytic bath 46 by the operation of the circulating pump 44 and discharged to the drain receiver 57. Therefore, by executing the water exchange operation, the scales accumulated in the electrolytic bath 46 can be discharged to the outside of the air filtering apparatus 1.

Accordingly, in addition of the effect of cleaning the respective parts of the electrolytic water circulating unit 2, the frequency of cleaning and maintenance of the respective parts of the electrolytic water circulating unit 2 can be greatly reduced, the maintenance can be facilitated, and the labor and cost required for the maintenance can be greatly reduced.

Here, the air filtering apparatus 1 may control the current supplied to the electrodes 47 and 48 to change the concentration of the active oxygen species contained in electrolytic water. Therefore, if in the operation described with reference to FIG. 11 the polarities of the electrodes 47, 48 are not inverted and the current supply to the electrodes 47, 48 is controlled so that active oxygen species are generated at a higher concentration than that under the normal operation, the respective parts of the electrolytic water circulating unit 2 can be strongly cleaned and the cleanliness can be surely kept. In this case, active oxygen species (hypochlorous acid or the like) having a higher concentration than usual are generated, and thus it is desired to give consideration so that the odor of the active oxygen species is prevented from leaking to the housing 11. In the operation shown in FIG. 11, the louver 20 is closed so that the leakage of odor can be prevented. Therefore, the cleanliness can be kept while the atmosphere of the room where the air filtering apparatus 1 is set up can be kept comfortable.

When ozone is generated in the electrolytic bath 46 and when the active oxygen species of a higher concentration (containing active oxygen species other than ozone) are generated, odor inherent to ozone and high-concentration active oxygen species may occur. Accordingly, the air blow-out port 13 is closed by the louver 20, and also the air blowing fan 31 is stopped, whereby the odor hardly leaks to the outside of the housing 11. Therefore, the leakage of the odor to the outside of the housing 11 can be surely suppressed, so that the atmosphere of the room where the air filtering apparatus 1 is set up can be kept comfortable and the cleanliness of the inside of the air filtering apparatus 1 can be surely secured.

Furthermore, the air filtering apparatus 1 can execute the cleaning operation while the normal air filtering operation described above is stopped. In this case, when the air filtering operation of the air filtering apparatus 1 is stopped, the microcomputer 61 controls the timer counter 63 to start the count of an operation stop time (stop time T2). The timer counter 63 counts the time from zero every time the air filtering operation is stopped, and it resets the count value according to the control of the microcomputer 61 when the air filtering operation is started. Furthermore, the timer counter 63 resets the count value according to the control of the microcomputer 61 every time a cleaning operation described later is carried out.

When the operation stop time counted by the timer counter 63 reaches a preset time, the microcomputer 61 executes the cleaning operation of generating and circulating electrolytic water irrespective of the situation that the air filtering operation is stopped.

The cleaning operation will be described hereunder.

Figure 12:
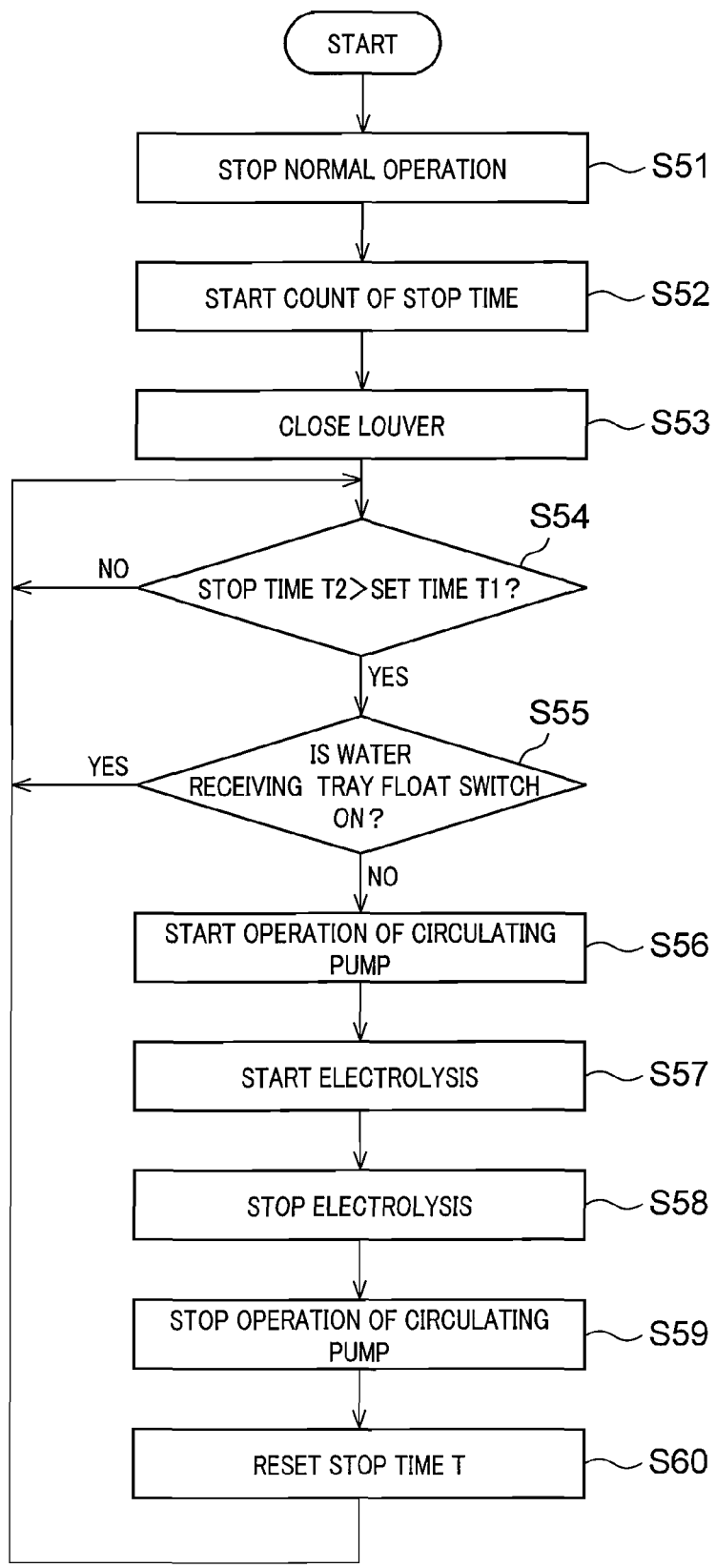
FIG. 12 is a flowchart showing the details of a cleaning operation executed in the air filtering apparatus according to a second embodiment.

FIG. 12 is a flowchart showing the cleaning operation executed by the air filtering apparatus 1.

When the operation of the air filtering apparatus 1 is stopped (step S51), the microcomputer 61 controls the timer counter 63 to start the time count of the stop time T2 of the air filtering apparatus (step S52).

Subsequently, the microcomputer 61 drives the louver driving motor 68 to set the louver 20 to the close state (step S53), and monitors the stop time T2 counted by the timer counter 63 (step S54). Here, when the stop time T2 exceeds a set time T1 which is stored in the storage portion 62 in advance (step S54; Yes), the microcomputer 61 detects the state of the water receiving float switch 43 (step S55).

When the water receiving tray float switch 43 is switched on (step S55; Yes), that is, when the water level of the water receiving tray 42 is low, this situation is unsuitable for the cleaning operation, and thus the processing returns to the step S54.

Furthermore, when the water receiving tray float switch 43 is not switched on (step S55; No), the microcomputer 61 starts the operation of the circulating pump 44 (step S56). Subsequently, the microcomputer 61 applies a voltage to the electrodes 47, 48 of the electrolytic bath 46 to generate electrolytic water (step S57).

Accordingly, the electrolytic water containing active oxygen species in the electrolytic bath is generated, and this electrolytic water is circulated in the electrolytic water circulating unit 2, so that the gas-liquid contact member 53 is prevented from being dried. Furthermore, virus, etc. adhering to the respective parts of the electrolytic water circulating unit 2 containing the gas-liquid contact member 53 are inactivated, various bacteria, fungus, etc. are sterilized and foreign materials such as odor materials, etc. are decomposed, so that the cleanliness of the electrolytic water circulating unit 2 can be kept.

The microcomputer 61 continues the operation for a predetermined time or for only a time indicated by the operation of the operating panel 16 from the time when the application of the voltage to the electrodes 47, 48 is started, and then it stops the voltage application (step S58) and stops the circulating pump 44 (step S59). That is, the electrolytic water is circulated in the electrolytic water circulating unit 2 for the predetermined time or for only the time indicated by the operation of the operating panel 16.

Thereafter, the microcomputer 61 resets the stop time T2 counted by the timer counter 63 (step S60). The timer counter 63 starts the count of the stop time from an initial value (for example, zero), and the microcomputer 61 returns to the operation of the step S54.

As described above, in the air filtering apparatus 1 configured to perform the air filtering operation in which the electrolytic water is generated and infiltrated into the gas-liquid contact member 53 and the indoor air is blown to the gas-liquid contact member 53 by the air blowing fan 31 to filter the air, during the stop of the air filtering operation, the cleaning operation is executed every time a predetermined time, and the electrolytic water is circulated in the electrolytic water circulating unit 2, whereby the gas-liquid contact member 53 is prevented from being dried and the respective parts of the electrolytic water circulating unit 2 can be kept clean. If the cleaning operation described above is executed every time the operation stop time reaches 24 hours or every several hours, the gas-liquid contact member 53 can be prevented from being dried, and breeding of various bacteria, fungus, etc. due to foreign materials adhering to the gas-liquid contact member 53 can be suppressed by the action of the electrolytic water. Accordingly, the maintenance during the time when the air filtering apparatus 1 is stopped can be facilitated, so that taint damage of the electrolytic water circulating unit 2 containing the gas-liquid contact member 53 can be prevented and the inside of the air filtering apparatus 1 can be kept clean with small labor.

During the cleaning operation, the fan motor 32 is stopped, and only the circulating pump 44 and the electrolytic bath 46 are operated, so that the operating sound of the air filtering apparatus 1 is extremely small. In addition, prior to the cleaning operation, the air blow-out port 13 is closed by the louver 20, whereby the operating sound of the air filtering apparatus 1 is prevented from leaking to the outside of the housing 11. Therefore, even when the cleaning operation is executed, it does not make the user uncomfortable, and also there is no problem even when the cleaning operation is executed in the night, for example.

Furthermore, odor which is derived from the electrolytic water circulated in the electrolytic water circulating unit 2 during the cleaning operation does not leak to the outside of the housing 11, and thus the odor does not make the user have uncomfortable feeling. Accordingly, the cleaning operation can be executed and the inside of the air filtering apparatus 1 can be kept clean with no restriction to the time zone and the setup atmosphere.

In the cleaning operation described above, electrolytic water containing active oxygen species having a higher concentration than that under the normal air filtering operation may be generated. In this case, the respective parts of the electrolytic water circulating unit 2 containing the gas-liquid contact member 53 can be more surely sterilized. When the active oxygen species are generated at a high concentration, the user might have an uncomfortable feeling if odor inherent to the active oxygen species (hypochlorous acid or the like) leaks to the outside of the air filtering apparatus 1. However, according to the first embodiment, the louver 20 is set to the close state before the cleaning operation, and the fan motor 32 is stopped and thus the air blowing is not carried out by the air blowing fan 31 during the cleaning operation. Therefore, the odor derived from the active oxygen species does not leak to the outside of the air filtering apparatus 1, so that the user does not feel uncomfortable and the cleanliness of the inside of the air filtering apparatus 1 can be kept.

In the above embodiment of the present invention, the same kind of active oxygen species as the normal air filtering operation are generated during the cleaning operation. However, the present invention is not limited to this embodiment. For example, electrolytic water containing different kind of active oxygen species (for example, ozone) from the active oxygen species under the normal air filtering operation may be generated in the electrolytic bath 46 under the cleaning operation.

Next, a second embodiment according to the present invention will be described hereunder by concentrating on the case where electrolytic water containing a different kind of active oxygen species from the kind of active oxygen species generated under the normal air filtering operation are generated.

According to the second embodiment of the present invention, in the air filtering apparatus 1, an ozone cleaning operation is executed in place of the cleaning operation described above.

That is, during the normal air filtering operation, the microcomputer 61 applies a voltage between the electrodes 47 and 48 so that the electrode 47 of the electrolytic bath 46 is set to the positive potential, thereby generating hypochlorous acid having strong sterilization force from the electrode 47 side. On the other hand, during the ozone cleaning operation, the microcomputer 61 inverts the polarities of the electrodes and applies a voltage between the electrodes 47 and 48 so that the electrode 48 is set to the positive potential. At this time, in the electrolytic bath 46, ozone having strong sterilization force is generated from the electrode 48 side, hydrogen peroxide is generated from the electrode 47 side, and electrolytic water containing ozone is circulated in the electrolytic water circulating unit. The ozone cleaning operation is executed every predetermined time while the air filtering apparatus 1 is stopped for the purpose of preventing the gas-liquid contact member 53 from being dried and also suppressing breeding of various bacterial, fungus, etc. and virus, etc. in the gas-liquid contact member 53.

Figure 13:
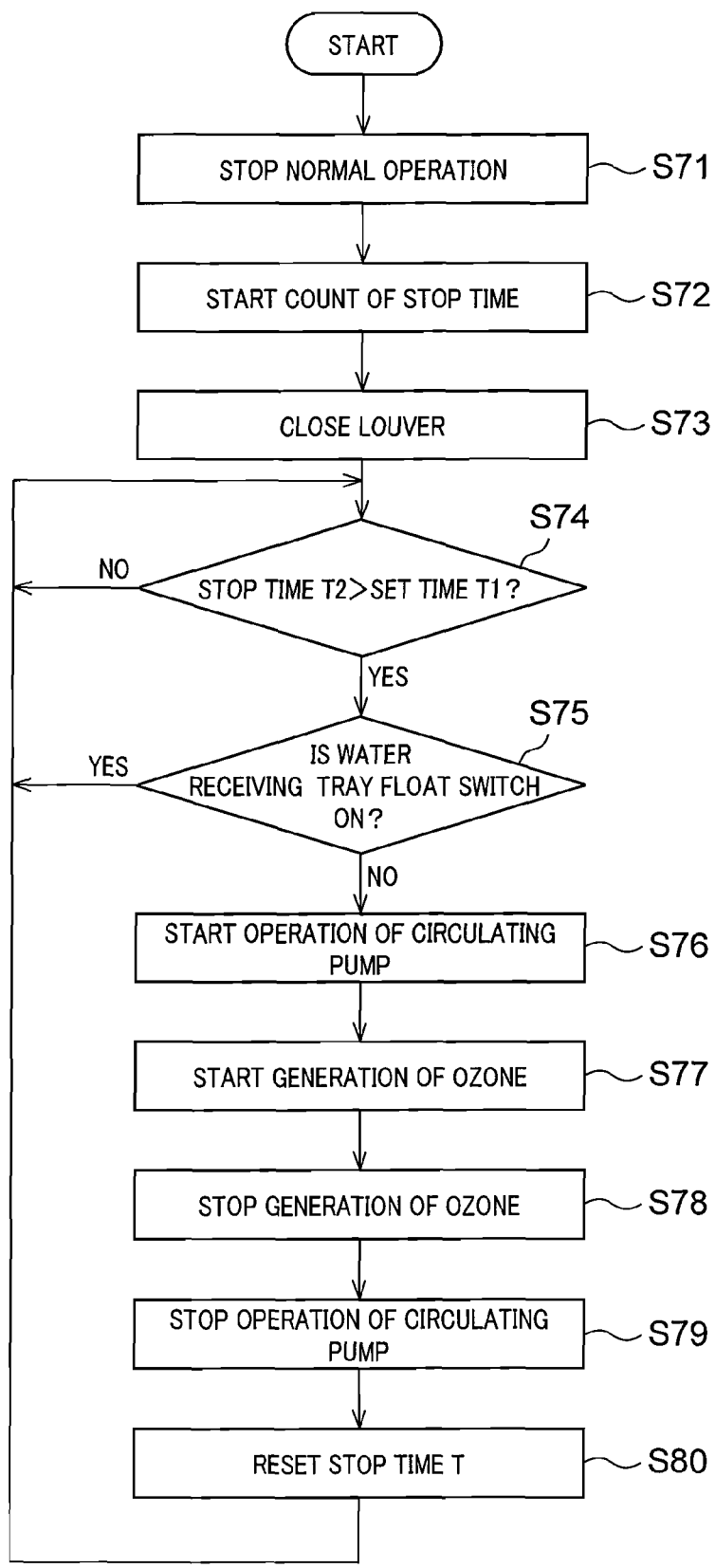
FIG. 13 is a flowchart showing an ozone cleaning operation executed in the air filtering apparatus according to a third embodiment.

FIG. 13 is a flowchart showing the ozone cleaning operation.

First, when the operation of the air filtering apparatus 1 is stopped (step S71), the microcomputer 61 controls the timer counter 63 to start the count of the stop time T2 of the air filtering apparatus 1 (step S72).

Subsequently, the microcomputer 61 derives the louver driving motor 68 to set the louver 20 to the close state (step S73), and monitors the stop time T2 counted by the timer counter 63 (step S74). Here, when the stop time T2 exceeds the set time T1 stored in the storage portion 62 in advance (step S74; Yes), the microcomputer 61 detects the state of the water receiving tray float switch 43 (step S75).

When the water receiving tray float switch 43 is switched on (step S75; Yes), that is, when the water level of the water receiving tray 42 is low, this situation is unsuitable for the ozone cleaning operation, and thus the microcomputer 61 returns to the step S74.

On the other hand, when the water receiving tray float switch 43 is not switched on (step S75; No), the microcomputer 61 starts the operation of the circulating pump 44 (step S76), and then applies a voltage between the electrodes 47, 48 of the electrolytic bath 46 to generate ozone (step S77).

Accordingly, electrolytic water containing ozone is generated in the electrolytic bath 46, and this electrolytic water is circulated in the electrolytic water circulating unit 2, so that the gas-liquid contact member 53 is prevented from being dried, virus, etc. adhering to the respective parts of the electrolytic water circulating unit 2 containing the gas-liquid contact member 53 are inactivated, various bacteria, etc. are sterilized and foreign materials such as odor materials, etc. are decomposed. Therefore, the cleanliness of the electrolytic water circulating unit 2 can be kept.

The microcomputer 61 continues the operation for a predetermined time or a time indicated by the operation of the operating panel from the start of the voltage application to the electrodes 47, 48, and then it stops the voltage application (step S78) and stops the circulating pump 44 (step S79). That is, electrolytic water containing ozone is circulated in the electrolytic water circulating unit 2 for the predetermined time or for the time indicated by the operation of the operating panel 16.

Thereafter, the microcomputer 61 resets the stop time T2 counted by the timer counter 63 (step S80). The timer counter 63 starts the count of the stop time from the initial value (for example, zero), and the microcomputer 61 returns to the operation of the step S74.

According to the second embodiment, as in the case of the first embodiment, the gas-liquid contact member 53 is prevented from being dried, and also the respective parts of the electrolytic water circulating unit 2 can be kept to a clean state by the action of the electrolytic water. Furthermore, by generating electrolytic water containing ozone and circulating the electrolytic water in the electrolytic water circulating unit 2, the respective parts of the electrolytic water circulating unit 2 can be sterilized/deodorized by the strong oxidation action of ozone, thereby keeping these parts clean. Particularly, under the normal air filtering operation, electrolytic water containing hypochlorous acid in the electrolytic bath 46. During the ozone cleaning operation, the polarities of the electrodes are inverted, and electrolytic water containing ozone and hydrogen peroxide are generated. Therefore, the respective parts of the electrolytic water circulating unit 2 are cleaned by actively using plural kinds of active oxygen species having different actions, whereby the maintenance can be easily performed and the cleanliness of the electrolytic water circulating unit 2 can be more surely kept.

In addition, during the ozone cleaning operation, the fan motor 32 is stopped, and only the circulating pump 44 and the electrolytic bath 46 are operated. Therefore, the operating sound of the air filtering apparatus 1 is extremely small and the inside of the air filtering apparatus 1 can be kept clean without making the user uncomfortable.

Here, Ozone has gas having peculiar odor. Therefore, when odor of ozone leaks to the outside of the housing 11, it may makes users have uncomfortable feeling. Odor of ozone is particularly strong and thus users sense the odor even when the amount of ozone is small to the extent that it does not affect human bodies. However, according to this embodiment, the louver 20 is set to the close state before the ozone cleaning operation, so that odor of ozone hardly leaks to the outside of the air filtering apparatus 1 and the atmosphere of the room where the air filtering apparatus 1 is set up can be kept comfortable. Furthermore, the fan motor 32 is stopped during the ozone cleaning operation, and thus no air blowing is carried out by the air blowing fan 31. Therefore, air flow between the inside and outside of the housing 11 is greatly suppressed, so that the leakage of odor to the outside of the housing 11 can be more surely and effectively suppressed.

Accordingly, as in the case of the cleaning operation according to the first embodiment, the ozone cleaning operation can be executed to keep the cleanliness of the inside of the air filtering apparatus with no restriction to the time zone and the setup atmosphere.

Furthermore, in the above construction, by inverting the polarities of the electrodes 47, 48 during the ozone cleaning operation, the kind of the active oxygen species contained in the electrolytic water can be easily switched. Therefore, electrolytic water containing ozone and electrolytic water containing other active oxygen species can be easily used without complicating the construction of the air filtering apparatus 1 needlessly.

In addition, by inverting the polarities of the electrodes 47, 48 during the ozone cleaning operation, scales deposited on the cathode during the air filtering operation are exfoliated/drop out from the electrode.

During the air filtering operation, scales (for example, calcium-based scales such as calcium carbonate, magnesium-based scales such as magnesium-based carbonate) derived from inorganic materials (containing ions) contained in water which is supplied to the electrolytic bath 46 are particularly deposited on the cathode side electrode surface. When scales are deposited on the electrodes, the electrical conductivity is lowered, and it is difficult to perform continual electrolysis. In the air filtering apparatus 1, by inverting the polarities of the electrodes during the ozone cleaning operation, the scales deposited on the electrodes drop out and thus the reduction in the electrolysis efficiency of the electrodes 47, 48 can be prevented. Accordingly, the frequency of maintenance containing the cleaning of the electrodes 47, 48 can be greatly reduced, and the labor and cost required for the maintenance can be reduced.

In the first and second embodiments, the water stocked in the water supply tank 41 is electrolyzed and circulated. However, the present invention is not limited to these embodiments, and a construction that water is supplied from the external as needed may be adopted.

This construction will be described hereunder as a third embodiment.

Figure 14:
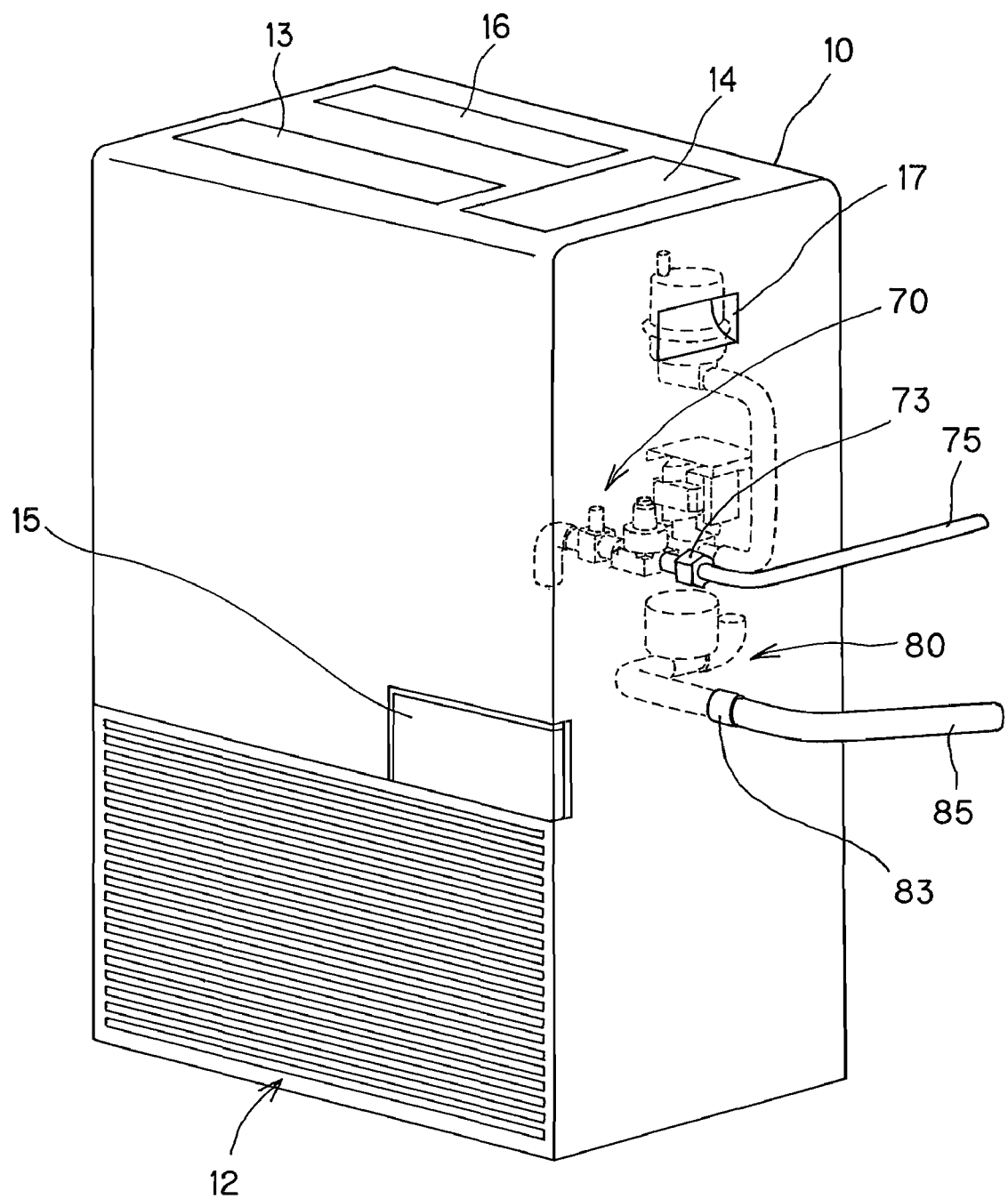
FIG. 14 is a perspective view showing the outlook of the construction of the air filtering apparatus according to a fourth embodiment.
Figure 15:
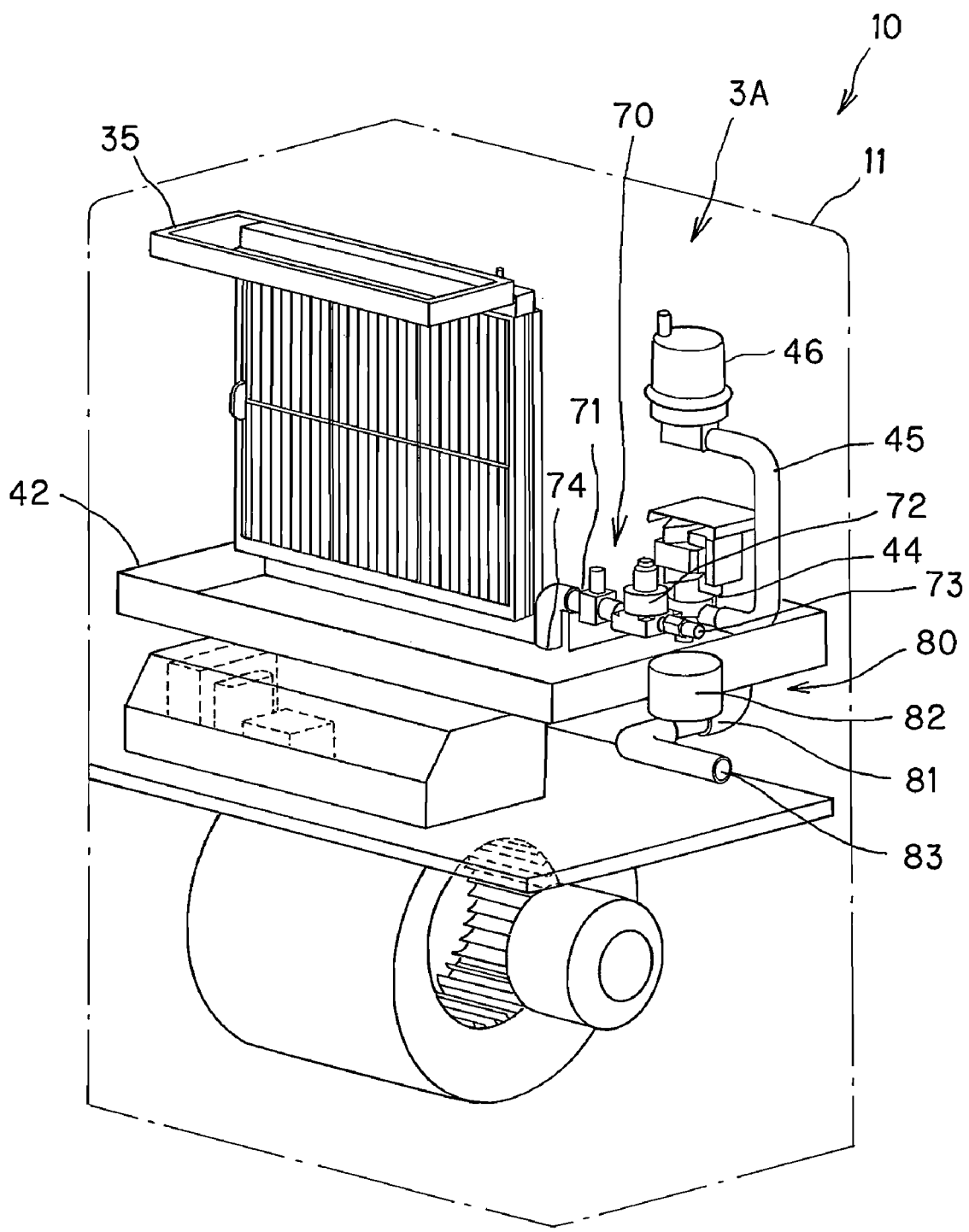
FIG. 15 is a diagram showing the internal construction of the air filtering apparatus of FIG. 14.

FIG. 14 is a perspective view showing the outlook of an air filtering apparatus 10 according to a third embodiment of the presents invention. FIG. 15 is a perspective view showing the internal construction of the air filtering apparatus 10.

This air filtering apparatus 10 is provided with a water supply unit 70 and a drain portion 80 in place of the water supply tank 41 and the drain receiver 57 respectively in the air filtering apparatus 1 of the first and second embodiments.

The water supply unit 70 supplies the electrolytic circulating unit 2 with water from a water supply pipe 75 connected to a public water supply pipe, for example. Furthermore, the drain unit 80 discharges the water of the electrolytic water circulating unit 2 to a drain pipe 85 connected to a sewer pipe, for example.

As shown in FIG. 15, the water supply unit 70 is equipped with a water conducting tube extending from the side wall of the housing 11 to the upper side of the water receiving tray 42, a water supply valve 72 for opening/closing the water conducting tube 71 and a spout 74 which is opened downwardly at the tip of the water conducting tube 71. The lower end of the spout 74 is located at such a height that it is not submerged in the water of the water receiving tray 42, and preferably it is located above the water stock portion 42A. A connection port 73 is formed at the base end of the water conducting tube 71, and it intercommunicates with the water supply pipe 75 through the connection port 73. The connection port 73 is fixed to a panel constituting the side surface of the housing 11.

The drain unit 80 has a discharge pipe 81 intercommunicating with an opening portion (not shown) formed in the bottom surface of the water stock portion 42A, a drain valve 82 for opening/closing the discharge pipe 81, and a connection port 83 formed at the tip of the discharge pipe 81. The connection port 83 is fixed to the panel constituting the side surface of the housing 11, and intercommunicates with the drain pipe 85.

The water supply valve 72 is opened/closed under the control of the microcomputer 61 of the controller 60 (FIG. 8) to control the water supply to the electrolytic water circulating unit 2. Specifically, the microcomputer 61 opens the water supply valve 72 to supply water when the water level of the water receiving tray 42 is lowered and thus the water receiving tray float switch 43 (FIG. 8) is switched on. Thereafter, when detecting that the water receiving tray float switch 43 is switched off, the microcomputer 61 closes the water supply valve 72 and finishes the water supply.

Furthermore, the drain valve 82 is opened/closed under the control of the microcomputer 61. The microcomputer 61 opens the drain valve 82 to discharge water stocked in the water receiving tray 42 every time the operation stop time of the air filtering apparatus 1 reaches a predetermined time, or every time the operation stop time of the air filtering apparatus 1 reaches a predetermined or every time a predetermined time. Here, the microcomputer 61 may close the drain valve 82 to finish the drainage at the time point when the water receiving tray float switch 43 is switched on and the water level of the water receiving tray 42 is reduced to a predetermined level or less, or the microcomputer 61 may close the drain valve 82 after a predetermined time elapses from the switch-on time of the water receiving tray float switch 43.

Furthermore, the microcomputer 61 may open the water supply valve 72 to supply water and operate the circulating pump 44 to circulate water in the electrolytic water circulating unit 2 while the drain valve 82 is opened to discharge water.

In the air filtering apparatus 10 according to the third embodiment, a required amount of water can be used at all times with no restriction to the capacity of the water supply tank 41. Therefore, even when water of the electrolytic water circulating unit 2 is lost due to vaporization or the like, the user is never required to carry out any operation associated with water supply. Furthermore, even when water circulated in the electrolytic water circulating unit 2 is old, the user is never required to carry out any operation associated with drainage. Accordingly, fresh water can be circulated in the electrolytic water circulating unit 2 by automatic drainage and water supply as described above. Accordingly, the air filtering apparatus can be continuously operated for a long term by merely carrying out maintenance at an extremely low frequency.

Particularly, in the air filtering apparatus 10 according to the third embodiment, the cleaning operation described in the first embodiment and the ozone cleaning operation described in the second embodiment can be carried out. Accordingly, even when the time period for which the air filtering operation of the air filtering apparatus 10 is not carried out is several weeks to several months or a longer term, the cleanliness of the electrolytic water circulating unit 2 can be kept without imposing labor on the user. Therefore, the maintenance can be easily performed, and the inside of the air filtering apparatus 1 can be kept clean with small labor.

Furthermore, when the ozone cleaning operation is executed in the air filtering apparatus 10, scales are exfoliated from the electrodes 47, 48 in the electrolytic bath 46 as described above, and the exfoliated scales, etc. can be discharged by the drain unit 80, so that the labor associated with the maintenance of the air filtering apparatus 1 can be greatly reduced.

The present invention is not limited to the first to third embodiments described above, and various modifications may be made to the embodiments without departing from the subject matter of the present invention.

For example, in the above embodiments, the two pair of electrodes 47 and 48 are provided, and the kind of the active oxygen species contained in the electrolytic water is switched to hypochlorous acid or ozone, hydrogen peroxide by inverting the polarities of the respective electrodes 47 and 48. However, the construction of the electrodes provided to the electrolytic bath 46 is not limited to the above construction. For example, in the electrolytic bath 46, the two electrodes 47 may be connected to each other in parallel and one electrode 48 may be provided so that the three electrodes are arranged in the electrolytic bath 46. Furthermore, two third electrodes to which negative potential is applied at all times may be provided in the electrolytic bath 46, and the electrode 47, the electrode 48 and the two third electrodes are respectively paired, so that water is electrolyzed by applying a voltage between the electrode 47 and the third electrode and between the electrode 48 and the third electrode. Here, platinum, carbon ©, stainless (Fe—Cr—(Ni) based alloy) or the like may be used as the third electrode. When the third electrode is newly provided and each of the electrodes 47 and 48 is paired with the third electrode by switching the electrodes 47 and 48 to each other, it is preferable that the electrode to be paired with the third electrode is alternately switched between the electrode 47 and the electrode 48. Furthermore, by switching the electrodes 47 and 48 to each other as the electrode to be paired with the third electrode, it is particularly preferable to generate hypochlorous acid and ozone as the active oxygen species.

Furthermore, the air filtering apparatus 1, 10 may be modified so that plural electrolytic bathes 46 are provided, an electrode 47 and a third electrode are inserted as paired electrodes in some electrolytic bathes 46, an electrode 48 and a third electrode are inserted as paired electrodes in the other electrolytic bathes 46, and the electrolytic bathes 46 for electrolyzing water such as tap water or the like are properly switched to switch the kind of active oxygen species contained in electrolytic water to be dropped or infiltrated to the gas-liquid contact member 53.

Furthermore, the electrodes provided in the electrolytic bath 46 may be planar electrodes, rod-shaped electrodes or electrodes having other shapes.

Furthermore, in the respective embodiments described above, by electrolyzing tap water in the electrolytic bath 46, active oxygen species are generated by using chlorine ions contained in tap water. However, the air filtering apparatus may be equipped with an ozone generating device for generating ozone by air discharge so that ozone generated by the ozone generating device is dissolved in water and supplied to the gas-liquid contact member 53. In this case, the ozone generating device may be designed to supply the generated ozone to the electrolytic bath 46, or designed to supply ozone generated in the ozone generating device to electrolytic water generated in the electrolytic bath 46 and dissolve the ozone into the electrolytic water. According to the construction as described above, even when the ion species of tap water or the like to be introduced to the electrolytic bath 46 is diluted and thus it is difficult to generate ozone by electrolyzing tap water or the like, it is possible to generate electrolytic water containing ozone as active oxygen species and drop or infiltrate the electrolytic water to the gas-liquid contact member.

Furthermore, in the above embodiments, under the state that the polarities of the electrodes 47 and 48 are set to the inversion state from the beginning, the air filtering operation may be carried out by using electrolytic water containing ozone and hydrogen peroxide. In this case, even when the ion species in water to be supplied to the electrolytic bath 46 is diluted, the air filtering can be performed with no problem.

What is claimed is:

1. An air filtering apparatus including an electrolytic bath for electrolyzing water to generate electrolytic water, a gas-liquid contact member in which the electrolytic water generated in the electrolytic bath infiltrates and an air blowing fan for blowing air to the gas-liquid contact member comprising:
    a water circulation passage through which the electrolytic water is supplied/circulated to the gas-liquid contact member, the electrolytic water passing through the gas-liquid contact member is received and stocked by a water receiving tray and the stocked electrolytic water is pumped up and supplied to the gas-liquid contact member;
    a drain pipe branched from the water circulation passage;
    a water stop valve for opening/closing the drain pipe; and
    a drain receiver for receiving and stocking the electrolytic water discharged from the drain pipe when the water stop valve is opened, wherein a part of the water receiving tray is provided with a stock portion having a bottom deeper than that of the water receiving tray, and the drain pipe extends from the stock portion of the water receiving tray to the drain receiver located at a lower side of the water receiving tray.

2. The air filtering apparatus according to claim 1, further comprising a time counter for counting an operation time, and a controller for opening the water stop valve when the operation time counted by the time counter reaches a predetermined time.

3. The air filtering apparatus according to claim 2, wherein the electrolytic bath is designed to generate electrolytic water by applying a voltage between at least a pair of electrodes, under normal operation the controller may apply the voltage between the plural electrodes of the electrolytic bath to generate the electrolytic water, circulate the electrolytic water along the water circulation passage and control the air blowing fan to blow air, and also when the water stop valve is opened for drainage, the controller may generate electrolytic water while the polarities of the electrodes are inverted, circulate the thus-generated electrolytic water in the water circulation passage, and then open the water stop valve.

4. The air filtering apparatus according to claim 3, wherein the controller has a function of electrolyzing water under the state that the polarities of the plural electrodes of the electrolytic bath are inverted.

5. The air filtering apparatus according to claim 4, further comprising an exhaust port through which air passing through the gas-liquid contact member is discharged, and a lid member which can close the exhaust port, and the controller inverts the polarities of the electrodes of the electrolytic bath under the state that the exhaust port is closed by the lid member.

6. The air filter apparatus according to claim 1, further comprising a water supply unit for supplying water from a water supply pipe at the outside to the water circulation passage, and a drain unit that is branched from the water circulation passage and discharges the electrolytic water.

* * * * *